(12) United States Patent
Javerschek

(10) Patent No.: US 10,605,509 B2
(45) Date of Patent: Mar. 31, 2020

(54) REFRIGERATION SYSTEM

(71) Applicant: BITZER Kuehlmaschinenbau GmbH, Sindelfingen (DE)

(72) Inventor: Oliver Javerschek, Tuebingen (DE)

(73) Assignee: BITZER Kuehlmaschine GmbH, Sindelfingen (DE)

( * ) Notice: Subject to any disclaimer, the term of this patent is extended or adjusted under 35 U.S.C. 154(b) by 13 days.

(21) Appl. No.: 15/878,882

(22) Filed: Jan. 24, 2018

(65) Prior Publication Data

US 2018/0156513 A1 Jun. 7, 2018

Related U.S. Application Data

(63) Continuation of application No. PCT/EP2016/067759, filed on Jul. 26, 2016.

(30) Foreign Application Priority Data

Jul. 29, 2015 (DE) .................. 10 2015 112 439

(51) Int. Cl.
*F25B 49/02* (2006.01)
*F25B 1/10* (2006.01)
(Continued)

(52) U.S. Cl.
CPC .............. *F25B 49/022* (2013.01); *F25B 1/10* (2013.01); *F25B 25/005* (2013.01); *F25B 39/04* (2013.01); *F25B 43/006* (2013.01); *F25B 49/02* (2013.01); *F25B 5/02* (2013.01); *F25B 9/008* (2013.01); *F25B 41/04* (2013.01); (Continued)

(58) Field of Classification Search
CPC ........ F25B 49/022; F25B 43/006; F25B 1/10; F25B 49/02; F25B 2700/21163; F25B 2700/2106; F25B 2700/1931; F25B 2600/2519; F25B 2600/2513; F25B 2600/0253; F25B 2500/19; F25B 2400/23; F25B 2400/0751; F25B 2400/0401;
(Continued)

(56) References Cited

U.S. PATENT DOCUMENTS 6,161,394 A 12/2000 Alsenz
2014/0326018 A1 11/2014 Ignatiev

FOREIGN PATENT DOCUMENTS

CH 703 290 A1 12/2011
DE 43 09 137 A1 8/1994
WO WO 2009/086493 A2 7/2009

*Primary Examiner* — Ana M Vazquez
(74) *Attorney, Agent, or Firm* — Reinhart Boerner Van Deuren P.C.

(57) ABSTRACT

A refrigeration system is of the type that includes a refrigerant compressor unit which compresses normal refrigerating mass flow and a parallel compressor. The parallel compressor in a parallel compression mode of operation of the refrigerant circuit, sucks in refrigerant from the intermediate pressure accumulator and compresses it to high pressure. It is proposed that, in order to increase efficiency, the power of the parallel compressor is controlled by a control system. The control system determines at least one reference variable representing a load state of the refrigerant circuit, that determines a set intermediate pressure value on the basis of the at least one reference variable at least in a parallel compression mode of operation, and that regulates the intermediate pressure in accordance with the set intermediate pressure value at least in the parallel compression mode of operation.

54 Claims, 13 Drawing Sheets

(51) Int. Cl.
  *F25B 25/00*   (2006.01)
  *F25B 43/00*   (2006.01)
  *F25B 39/04*   (2006.01)
  F25B 9/00    (2006.01)
  F25B 5/02    (2006.01)
  F25B 41/04   (2006.01)

(52) U.S. Cl.
  CPC ... *F25B 2309/061* (2013.01); *F25B 2339/044* (2013.01); *F25B 2341/0662* (2013.01); *F25B 2400/0401* (2013.01); *F25B 2400/0751* (2013.01); *F25B 2400/23* (2013.01); *F25B 2500/19* (2013.01); *F25B 2500/29* (2013.01); *F25B 2600/0253* (2013.01); *F25B 2600/2509* (2013.01); *F25B 2600/2513* (2013.01); *F25B 2600/2519* (2013.01); *F25B 2700/1332* (2013.01); *F25B 2700/1931* (2013.01); *F25B 2700/21* (2013.01); *F25B 2700/2106* (2013.01); *F25B 2700/21163* (2013.01); *Y02B 30/741* (2013.01)

(58) Field of Classification Search
  CPC ........ F25B 2341/0662; F25B 2309/061; F25B 5/02; Y02B 30/741
  See application file for complete search history.

REFRIGERATION SYSTEM

CROSS-REFERENCE TO RELATED PATENT APPLICATIONS

This application is a continuation of International application number PCT/EP2016/067759 filed on Jul. 26, 2016.

This patent application claims the benefit of International application No. PCT/EP2016/067759 filed on Jul. 26, 2016 and German application No. 10 2015 112 439.4 of Jul. 29, 2015, the teachings and disclosure of which are hereby incorporated in their entirety by reference thereto.

BACKGROUND OF THE INVENTION

The invention relates to a refrigeration system comprising a refrigerant circuit through which an overall mass flow of a refrigerant is fed, a heat exchanger which is arranged in the refrigerant circuit for cooling refrigerant at the high pressure side, an expansion element which is arranged in the refrigerant circuit and, in the active state, cools the overall mass flow of the refrigerant by expansion and thereby produces a main mass flow consisting of liquid refrigerant and an auxiliary mass flow consisting of gaseous refrigerant which enter an intermediate pressure accumulator and are separated therein into the main mass flow and the auxiliary mass flow, at least one normal refrigerating stage which extracts a normal refrigerating mass flow from the main mass flow in the intermediate pressure accumulator and expands it to a low pressure in at least one normal refrigerating expansion unit and thereby makes the refrigerating capacity available for the normal refrigerating process, a refrigerant compressor unit which compresses the normal refrigerating mass flow from low pressure to high pressure, and a parallel compressor which sucks refrigerant from the intermediate pressure accumulator in a parallel compression mode of operation of the refrigerant circuit and compresses it to high pressure.

Refrigeration systems of this type are known from the state of the art.

In these refrigeration systems, there is always a need for operating them as efficiently as possible.

SUMMARY OF THE INVENTION

In accordance with the invention, this object is achieved in a refrigeration system of the type described hereinabove in that the power of the parallel compressor is controlled by a control system, in that the control system determines at least one reference variable representing a load state of the refrigerant circuit, in that the control system determines at least one set intermediate pressure value on the basis of the at least one reference variable in a parallel compressor mode of operation of the refrigerant circuit and in that the control system regulates the intermediate pressure in accord with the set intermediate pressure value at least in the parallel compressor mode of operation.

In particular, the regulation of the intermediate pressure to the set intermediate pressure value is effected by regulating the power of the parallel compressor, preferably, by regulating the speed.

The advantage of the solution in accordance with the invention is to be seen in that it is then possible to regulate the intermediate pressure to different varying intermediate pressure values by the provision of a set intermediate pressure value and thereby increase the efficiency of the refrigeration system by the variation of the intermediate pressure.

It is particularly advantageous hereby for the relationship between the reference variable and the set intermediate pressure value that is changing therewith to be determined in such a way that, taken with reference to the efficiency in the case of constant intermediate pressure in the parallel compression mode of operation, there results an increase in the efficiency due to the varying set intermediate pressure value.

Hereby, efficiency in the sense of the solution in accordance with the invention is to be understood as being the overall efficiency of the refrigeration system which can be determined from the energy for the operation of the refrigeration system that is needed for the particular refrigerating capacity.

In particular thereby, an integration of the efficiency over a defined time period, of one year for example, is envisaged whereby different values for the integrated efficiency result due to climatic fluctuations during this year and the requisite refrigerating capacity at different geographical locations.

Preferably, the control system only takes into consideration reference variables which lie within an intermediate-pressure-varying range of reference variables for the purposes of determining the value of the set intermediate pressure.

In particular hereby, an intermediate-pressure-varying reference range is a sub-range of a load-dependent reference variable range which comprises the reference variables for all the possible load states of the refrigerant circuit, whereas an intermediate-pressure-varying range of reference variables only represents a partial section from this load-dependent range of reference variables.

A restriction of the intermediate-pressure-varying range of reference variables to a partial section of the load-dependent range of reference variables of this type has the advantage that the variation of the set intermediate pressure values can thereby be brought into a relationship with the values of the reference variables in which the variation of the set intermediate pressure value has the most significant effect on the efficiency.

Furthermore, provision is advantageously made for the control system to only draw on the set intermediate pressure values which lie in a range extending from a minimum intermediate pressure to a maximum intermediate pressure for the regulation of the intermediate pressure.

This solution has the great advantage that the variation of the set intermediate pressure values is thereby restricted to values which do not significantly affect the remaining control and regulating processes in the refrigerant circuit.

In particular, the provision of a minimum intermediate pressure having a lower limit for the set intermediate pressure values has the great advantage that the intermediate pressure is not thereby lowered to values which impair the functioning of the downstream refrigerating expansion units and in particular the normal refrigerating expansion unit and possibly also a deep-freezing expansion unit.

Furthermore, the maximum set intermediate pressure value is preferably arranged to be such that it is a set intermediate pressure value that is optimal for the efficiency at full load.

As yet, no particularly detailed information in regard to the relationship between the reference variables and the set intermediate pressure value resulting therefrom has been provided.

One advantageous solution envisages hereby that an increase of the value of the reference variable within the intermediate-pressure-varying range of reference variables leads to an increase of the value of the set intermediate pressure value and in particular too, that a reduction of the value of the reference variable leads to a reduction of the value of the set intermediate pressure value.

Hereby, due to this general relationship between the reference variable and the set intermediate pressure value, yet another differing relationship can exist in a particular case.

A very simple solution envisages that there be a linear relationship between the value of the reference variable and the set intermediate pressure value within the intermediate-pressure-varying range of reference variables.

Another advantageous solution envisages that the relationship between the value of the reference variable and the set intermediate pressure value be nonlinear within the intermediate-pressure-varying reference range.

Preferably, the determination of the set intermediate pressure value on the basis of the reference variable is effected by differing approaches.

One possibility is to determine the increase in the efficiency experimentally by varying the set intermediate pressure value for different reference variables and storing the corresponding pairs of values between the reference variable and the corresponding set intermediate pressure value in a table in the control system.

Another possibility consists in determining the increase in efficiency by simulation calculations for different reference values and variation of the set intermediate pressure value and likewise storage thereof in a table in the control system.

Another advantageous solution consists in specifying a relationship between the reference values, the reference variable and the set intermediate pressure values which enable an increase of the efficiency in relation to a constant set intermediate pressure value by means of a mathematical algorithm based on experimental or simulated data for example.

In regard to the efficiency, it has proved to be particularly advantageous if the relationship between the value of the reference variable and the set intermediate pressure value is predetermined by the operating limits of the parallel compressor.

This means that the characteristic curve of the operating limits simultaneously predetermines the characteristic curve of the relationship between the reference variable and the set intermediate pressure value.

In particular, for orientation on the operating limits, provision is made for the relationship between the reference variable and the set intermediate pressure value to be predetermined by selecting the largest possible value of the set intermediate pressure value within the operating limits of the parallel compressor for association with the respective values of the reference variable.

It is thereby ensured on the one hand that the parallel compressor is operated within its operating limits and, on the other hand, it is ensured that the set intermediate pressure value assigned to the respective value of the reference variable is selected to be as large as possible in order to keep the efficiency at as high a level as possible.

A selection of the set intermediate pressure value of this type can be created particularly advantageously if the values for the set intermediate pressure value are possible values lying along the operating limits of the parallel compressor.

As yet, no particular details have been given in the context of the preceding explanation of the individual solutions in regard to the type of the reference values.

Thus, one advantageous solution envisages that the value of the high pressure in the refrigerant circuit represents the reference variable.

Another advantageous solution envisages that a temperature of the refrigerant when emerging from the high pressure side of the refrigerant-cooling heat exchanger represents the reference variable.

A further advantageous solution envisages that an ambient temperature of the air cooling the high pressure side of the refrigerant-cooling heat exchanger represents the reference variable.

In the context of the solution in accordance with the invention, provision is made for the control system to draw on just a single reference variable for determining the set intermediate pressure value.

Another advantageous solution envisages that the control system draw on a plurality of reference variables for determining the set intermediate pressure value.

However, in addition thereto, provision is also made in the context of the solution in accordance with the invention for the control system to draw on still further parameters of the refrigerant circuit in addition to just the one reference variable or the plurality of reference variables for determining the set intermediate pressure value.

As yet, no particular details have been given in regard to the position of the intermediate-pressure-varying range of reference variables within the load-dependent reference range.

Thus, it has proved advantageous if the intermediate-pressure-varying range of reference variables also comprises a thermodynamically critical reference variable value, i.e. this thermodynamically critical reference variable value lies within the intermediate-pressure-varying range of reference variables.

As an alternative thereto, it is likewise of advantage if the intermediate-pressure-varying range of reference variables lies close to the thermodynamically critical reference variable value FK.

Herein, the expression "close to the thermodynamically critical reference variable value" is, for example, to be understood as one value that is less than 20% of the critical reference variable value, still better less than 15% of the critical reference variable value and preferably less than 10% of the critical reference variable value.

A thermodynamically critical reference variable value of this type is present when the refrigerant is in a state corresponding to the thermodynamic critical point.

If, for example, the reference variable is the high pressure in the refrigerant circuit, then the thermodynamically critical reference variable value is determined by the critical pressure of the refrigerant.

If, for example, the reference variable is the temperature of the refrigerant at the outlet of the high pressure side, refrigerant-cooling heat exchanger, then the critical temperature of the refrigerant corresponds to the thermodynamically critical reference variable value.

A further advantageous embodiment of the solution in accordance with the invention envisages that the intermediate-pressure-varying range of reference variables extend from an upper reference variable value to a lower reference variable value.

In this case, provision is made in one expedient solution for the upper reference variable value to coincide with the reference variable at full load.

Another advantageous solution envisages that the upper reference variable value lie below the reference variable for full load.

In the solution in accordance with the invention in this case, there is no variation of the set intermediate pressure value for values of the reference variable between the reference variable at full load and the upper reference variable value.

Preferably, the set intermediate pressure value remains at the set intermediate pressure value for values of the reference variable between the reference variable at full load and the upper reference variable value.

Moreover, a further expedient solution envisages that the lower reference variable value coincide with a parallel-compression-limiting reference variable value.

This means that the lower reference variable value of the intermediate-pressure-varying range of reference variables extends up to the parallel-compression-limiting reference variable value at which a transition from the parallel compression mode of operation to the flashgas/bypass mode of operation can take place.

As an alternative thereto, one expedient solution envisages that the lower reference variable value lie above the parallel-compression-limiting reference variable value.

In this case, provision is made for the set intermediate pressure value not to change between the lower reference variable value of the intermediate-pressure-varying range of reference variables and the parallel-compression-limiting reference variable value.

Preferably, the set intermediate pressure value remains constant in this case, preferably namely, at the set intermediate pressure value corresponding to the parallel-compression-limiting reference variable value.

In the refrigeration system in accordance with the invention, provision is preferably made for the control system to switch over from the parallel compression mode of operation to the flashgas/bypass mode of operation if the reference variable falls below a parallel-compression-limiting reference variable value.

A process of switching of this type from a parallel compression mode of operation to a flashgas/bypass mode of operation is necessary because the parallel compressor reaches its operating limits and can therefore only be operated with increased wear in the event of lower reference variables and thus lower load states.

In the transition to the flashgas/bypass mode of operation, provision is hereby made for the control system to switch off the parallel compressor in the flashgas/bypass mode of operation for example.

Another advantageous solution envisages that, in the flashgas/bypass mode of operation, the control system sets the parallel compressor from low pressure to high pressure for the purposes of compressing the refrigerant, but no longer however for compressing the auxiliary mass flow from the intermediate pressure accumulator.

Furthermore, in the flashgas/bypass mode of operation, provision is preferably made for the control system to operate the refrigerant circuit in such a way that an expansion element expands the refrigerant from the intermediate pressure accumulator to a lower pressure level and holds the intermediate pressure at a predetermined value.

Hereby, the predetermined value of the intermediate pressure in the flashgas/bypass mode of operation preferably corresponds to the set intermediate pressure value when reaching the parallel-compression-limiting reference variable value.

Hereby, the expansion of the refrigerant from the intermediate pressure accumulator can take place in the flashgas/bypass mode of operation preferably at low pressure.

The variation of the set intermediate pressure value corresponding to the reference variable can lead to the effect that the auxiliary mass flow that is to be compressed by the parallel compressor is very small and so the parallel compressor will have to be operated at a rotational speed for which it is not suitable.

For this reason, provision is preferably made for the control system to interrupt the variation or regulation of the set intermediate pressure value in dependence on the reference variable if the rotational speed of the parallel compressor has fallen to a predetermined minimum rotational speed and to restart it when the rotational speed of the parallel compressor is again higher than the predetermined minimum rotational speed.

Due to the provision of the minimum rotational speed, there is then the possibility of always operating the parallel compressor in a suitable speed range without it being damaged due to the variation or regulation of the set intermediate pressure value in dependence on the reference variable.

Hereby, the predetermined minimum rotational speed need not correspond to the minimum permissible rotational speed of the parallel compressor, but rather, it can also be selected to be different therefrom, be higher than it for example, depending on the conditions occurring in the refrigeration system or on the operational states that could arise.

As an alternative or in addition thereto, a further advantageous solution envisages that the control system interrupt the variation or regulation of the set intermediate pressure value in dependence on the reference variable if an opening degree of the expansion element has fallen to a predetermined minimum opening degree, and to start it again when the opening degree of the expansion element is again larger than the predetermined minimum opening degree.

Due to the predetermined minimum opening degree of the expansion element, there is likewise a magnitude available which represents a measure for the resulting auxiliary mass flow and thus a measure for the auxiliary mass flow that has, in turn, to be compressed by the parallel compressor and, together with the opening degree of the expansion element, it can thereby be ensured that there is a sufficiently large auxiliary mass flow.

By virtue of the opening degree of the expansion element, there is thus a definition as to the extent to which the expansion element opens in order to cool refrigerant at a high pressure by an expansion process and thereby produce the main mass flow consisting of the liquid refrigerant and the auxiliary mass flow consisting of the gaseous refrigerant.

The expansion element can thereby be opened to a greater or lesser extent between a minimum opening and a maximum opening depending upon the size of the overall mass flow that is flowing through the refrigeration system and the extent of this opening of the expansion element is referred to as the opening degree.

Further features and advantages of the invention form the subject matter of the following description together with the graphical illustration of some exemplary embodiments.

DETAILED DESCRIPTION OF THE INVENTION

Figure 1:
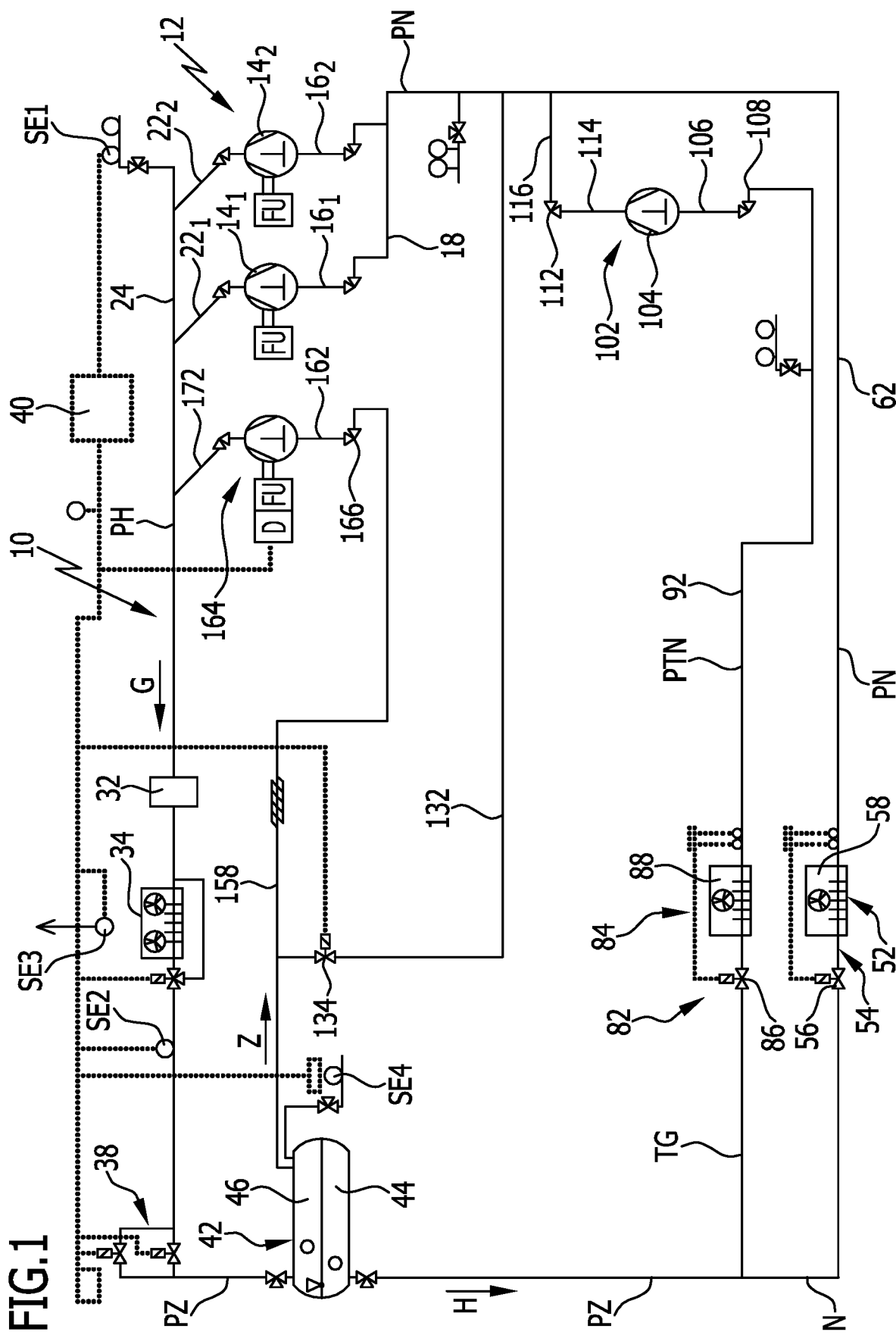
FIG. 1 shows a schematic illustration of a first exemplary embodiment of a refrigeration system in accordance with the invention.

A first exemplary embodiment of a refrigeration system in accordance with the invention which is illustrated in FIG. 1 comprises a refrigerant circuit bearing the general reference 10 in which there is arranged a refrigerant compressor unit bearing the general reference 12 which comprises a plurality of individual refrigerant compressors such as two refrigerant compressors $14_1$ to $14_2$ for example in the illustrated exemplary embodiment which are all connected in parallel in the refrigerant compressor unit 12.

Each of the refrigerant compressors $14_1$, $14_2$ comprises a suction-side connector $16_1$, $16_2$, wherein all the suction-side connectors 16 of the individual refrigerant compressors 14 are connected to a suction connector line 18 of the refrigerant compressor unit 12.

Furthermore, each of the refrigerant compressors 14 has a pressure side connector $22_1$, $22_2$, wherein all the pressure side connectors 22 of the individual refrigerant compressors 14 are connected to a pressure connector line 24 of the refrigerant compressor unit 12.

Consequently, all of the refrigerant compressors 14 work in parallel, but it is possible however to vary the compression power of the refrigerant compressor unit 12 in that individual ones of the refrigerant compressors 14 are operational and individual ones of the refrigerant compressors 14 are not operational.

Furthermore, it is possible to control the compression power of the refrigerant compressor unit 12 by a process of controlling the rotational speed in variable manner either of a working refrigerant compressor 14 or to individually control the rotational speed of particular working refrigerant compressors 14.

The refrigerant compressor unit 12 thus compresses refrigerants from a suction pressure in the suction connector line 18 which corresponds to a low pressure PN of a normal refrigerating stage which is yet to be described to a high pressure PH which is present in the pressure connector line 24 of the refrigerant compressor unit 12 and which can lie in a range of between approximately 40 bar (400 N/cm$^2$) and approximately 100 bar (1000 N/cm$^2$) for example.

The refrigerant under high pressure PH in the pressure connector line 24 forms an overall mass flow G which flows away from the pressure connector line 24 of the refrigerant compressor unit 12, then flows through an oil separator 32 and, after the oil separator 32, flows through a high pressure side heat exchanger 34 by means of which cooling of the refrigerant compressed to high pressure is effected.

Depending on whether a subcritical cyclic process or a supercritical cyclic process is occurring, then, due to the cooling of the overall mass flow G of the refrigerant compressed to a high pressure in the high pressure side heat exchanger 34, liquefaction thereof is effected or merely cooling thereof to a lower temperature, whereby in the case of a supercritical cyclic process only a sensible heat change is effected.

If carbon dioxide, i.e. $CO_2$, is used as the refrigerant, then, under the current ambient conditions, a supercritical cyclic process is usually present in which only cooling to a temperature which corresponds to an isotherm running outside the dew and bubble-point line or saturation curve is effected so that no liquefaction of the refrigerant occurs.

In contrast thereto, a subcritical cyclic process envisages that, due to the high pressure side heat exchanger 34, cooling is being effected to a temperature which corresponds to an isotherm passing through the dew and bubble-point line or saturation curve of the refrigerant.

The refrigerant that has been cooled down by the high pressure side heat exchanger 34 is supplied to an expansion element 38 which is arranged in a pressure line 36 and regulates the high pressure PH in correspondence with values delivered by a control system 40 and which, for example, is in the form of the expansion element 38 controlled by the control system 40 and expands the refrigerant of the overall mass flow G, which is under the high pressure PH, to an intermediate pressure PZ which corresponds to an isotherm passing through the dew and bubble-point line or saturation curve of the refrigerant.

The control system 40 controls the expansion element 38 in accordance with a temperature in the heat exchanger 34 and the operating limits of the refrigerant compressor 14 that have been provided thereto.

The intermediate pressure PZ lies, for example, in a range of between 35 bar and 45 bar and—as will be described in detail hereinafter—is regulated by the control system 40 in every possible operational state to a set intermediate pressure value PZS that is suitable for achieving as optimal an efficiency (COP) as possible.

The overall mass flow G of the refrigerant is set into a thermodynamic state by the expansion element 38 in which a main mass flow H is present in the form of liquid refrigerant and an auxiliary mass flow Z is present in the form of gaseous refrigerant.

Both mass flows H and Z are collected in an intermediate pressure accumulator 42 which comprises a reservoir for both the main mass flow H and for the auxiliary mass flow Z and they are separated from each other in the intermediate pressure accumulator 42, whereby the main mass flow H is in the form of a bath 44 of liquid refrigerant in the intermediate pressure accumulator 42 above which a gas volume 46 consisting of gaseous refrigerant is formed so that the bath 44 accommodates the main mass flow H and the gas volume 46 accommodates the auxiliary mass flow Z.

A normal refrigerating mass flow N in the form of a partial mass flow of the main mass flow H flows out of the intermediate pressure accumulator 42 from the main mass flow H forming the bath 44 of liquid refrigerant to a normal refrigerating stage which is designated as a whole by 52 and comprises one or more, for example, one normal refrigerating expansion unit 54.

This normal refrigerating expansion unit 54 comprises a normal refrigerating expansion element 56 by means of which expansion of the part of the normal refrigerating mass flow N arriving under the intermediate pressure PZ to a low pressure PN is effected, whereby cooling of the refrigerant by virtue of this expansion occurs in known manner thereby opening up the possibility of absorbing heat in the respective normal refrigerating heat exchanger 58 which follows the normal refrigerating expansion element 56 whereby there is an increase of enthalpy. The low pressure PN lies, for example, in a range of between 20 bar and 30 bar and is kept as constant as possible in all operational states, i.e. to within a maximum of ±3 bar of the predetermined value of low pressure PN.

The normal refrigerating mass flow N that has been expanded as a whole to the low pressure PN is supplied from the normal refrigerating heat exchangers 58 to a suction line 62 which, for its part, is connected to the suction connector line 18 of the refrigerant compressor unit 12 so that this expanded normal refrigerating mass flow N can be compressed by the refrigerant compressor unit 12 back to the high pressure PH.

Not only is the normal refrigerating mass flow N branched off as a partial flow from the main mass flow H in the intermediate pressure accumulator 42, but so too is a deep-freezing overall mass flow TG in the form of a further partial flow.

The deep-freezing overall mass flow TG is supplied to a deep-freezing stage 82 which comprises one or more, one for example, parallel deep-freezing expansion units 84, wherein each of these deep-freezing expansion units 84 comprises a deep-freezing expansion element 86 which expands and thus cools the deep-freezing overall mass flow TG down to a deep-freezing low pressure PTN, whereby the deep-freezing low pressure PTN is kept as constant as possible in all operational states and, for example, lies between 10 bar and 15 bar so that the deviations amount to maximally±3 bar.

Thereafter, the refrigerant that has been cooled down to the deep-freezing low pressure PTN is then supplied to a deep-freezing low-pressure-side heat exchanger 88 and is then in a position in the respective deep-freezing heat exchanger 88 to absorb heat at the deep-freezing temperatures whereby the enthalpy is increased.

The deep-freezing overall mass flow TH that has been expanded as a whole in the deep-freezing stage 82 to the deep-freezing low pressure PTN is supplied to a deep-freezing suction line 92 which is connected to the deep-freezing heat exchanger 88 and the deep-freezing overall mass flow TG that has been expanded to the deep-freezing low pressure PTN is supplied to a deep-freezing compressor unit which is designated as a whole by 102 and, for example, comprises one or more parallel operating deep-freezing compressors 104 which comprise a suction-side connector 106 which is connected to a deep-freezing suction connector 108 of the deep-freezing compressor unit 102 which, for its part, is in turn connected to the deep-freezing suction line 92 and receives the deep-freezing overall mass flow TG that has been expanded to the deep-freezing low pressure PTN.

Furthermore, the deep-freezing compressors 104 comprise a pressure side connector 112 which, for its part, is in turn connected to a deep-freezing pressure connector line 114 of the deep-freezing compressor unit 102.

The deep-freezing compressor unit 102 compresses the deep-freezing overall mass flow TG, which has flowed through the deep-freezing stage 82 and was expanded to the deep-freezing low pressure PTN, back to the normal refrigerating low pressure PN, whereby the deep-freezing mass flow TH that has been compressed to the normal refrigerating low pressure PN is supplied over a line 116 to the suction connector line 18 of the refrigerant compressor unit 12.

For the purposes of extracting the auxiliary mass flow Z from the gas volume 46 of the intermediate pressure accumulator 42, there is provided a receiving line 158 which leads to a suction line 162 of a parallel compressor 164 that is provided additionally to the refrigerant compressor unit 12, namely to a suction connector 166 thereof, and the pressure connector 172 whereof is in turn connected to the pressure connector line 24 so that it is possible to extract the auxiliary mass flow Z from the intermediate pressure accumulator 42 by appropriately controlling the rotational speed of the parallel compressor 164.

This mode of operation of the refrigerant circuit is called a parallel compression mode of operation.

Furthermore, there is provided a connecting line 132 to the suction line 62 which branches off from the receiving line 158 and in which there is provided an expansion element that is controlled by the control system 40 and is designated as a whole by 134 and which permits a flow of refrigerant in the direction of the receiving line 158 to the suction line 62.

By activating the expansion element 134, it is possible to employ the refrigerant compressors 14 of the refrigerant compressor unit 12 when the parallel compressor 164 is switched off such that refrigerant can be supplied from the intermediate pressure accumulator 42 by way of the receiving line 158 and the connecting line 132 to the suction line 62 by the expansion element 134 so that it can then be compressed by the refrigerant compressors 14 of the refrigerant compressor unit 12 to the high pressure PH, whereby the rotational speed of one of the refrigerant compressors 14 is likewise preferably regulated so that, in toto, two performance-controlled or speed regulated refrigerant compressors are available.

This mode of operation of the refrigerant circuit 10 is called a flashgas/bypass mode of operation.

The control system 40 controls the power of the parallel compressor 164 for the purposes of regulating the intermediate pressure PZ to a set intermediate pressure value PZS in the parallel compression mode of operation on the one hand, and activates or deactivates the expansion element 134 on the other namely, in accord with the current load states, whereby the load states are determined by the control system 40 by detecting at least one reference variable F.

If the refrigerant circuit 10 is being operated in the parallel compression mode of operation wherein the parallel compressor 164 is operating in the case of a deactivated expansion element 134, then the entire auxiliary mass flow Z is supplied over the receiving line 158 and the suction line 162 to the suction connector 166 of the parallel compressor 164 which then compresses the auxiliary mass flow Z to the high pressure PH that is present on the pressure connector 172 thereof.

Based on the values for the reference variable F, the control system 40 is in a position in the parallel compression mode of operation of determining a set intermediate pressure value PZS and regulating the values of the intermediate pressure PZ to the determined set intermediate pressure value PZS by controlling the power of the parallel compressor 164, in particular, by controlling the speed of the parallel compressor 164.

The determination of the set intermediate pressure value PZS is effected in dependence on the reference variable F by taking into consideration the efficiency of the entire refrigerant circuit 10 in the respective load state whereby the pairs of values for the respective reference variable F and the corresponding set intermediate pressure value PZS are determined by the control system 40 from either a table or a defined algorithm.

For example, if the high pressure PH in the pressure connector line 24 serves as a reference variable F, then the control system 40 detects the value of the high pressure PH by means of a sensor SE1 which can be arranged on the high pressure side in different positions, for example, connected to the pressure connector line 24.

Preferably, the sensor SE1 is arranged between the heat exchanger 34 and the expansion element 38.

If, for example, a refrigerant temperature T at the output of the high pressure side heat exchanger 34 is serving as a reference variable F', then the control system 40 detects the value thereof with a sensor SE2 which is arranged at the output side of the heat exchanger 34.

If, for example, the temperature of the ambient air flowing through the high pressure side heat exchanger 34 serves as a reference variable F''', then the control system 40 detects the value thereof with a sensor SE3.

However, it is also possible for the control system 40 to draw on two of the reference variables F, F' and F''' or all three reference variables F, F', F''' or yet further status parameters of the refrigerant circuit 10 for the determination of the set intermediate pressure value PZS.

Furthermore, if the control system 40 detects the value of the intermediate pressure PZ by means of a sensor SE4 which is connected to the intermediate pressure accumulator 42 for example, then it is in a position to regulate the intermediate pressure PZ in the intermediate pressure accumulator 42 to the determined set intermediate pressure value PZS.

Due to this process of regulating the intermediate pressure PZ in dependence on the particular reference variable F, the efficiency COP of the refrigerant compressor circuit 10 can be increased, in particular, if one observes the efficiency COP integrated over a longer period of operation, for example, a period of operation of one year.

Hereby, the general aim is to maintain the parallel compression mode of operation for as long a time as possible since, in principle, the parallel compression mode of operation offers significant advantages regarding the efficiency COP in relation to the flashgas/bypass mode of operation.

In any case however, the intermediate pressure PZ can only be varied between a maximum intermediate pressure MaPZ and a minimum intermediate pressure MiPZ as otherwise the other functions of the refrigerant circuit 10 such as the functioning of the normal refrigerating expansion unit 54 and/or the functioning of the deep-freezing expansion unit 84 for example are considerably impaired.

However, the parallel compression mode of operation cannot be maintained until reaching the minimum possible partial-load mode of operation since the operating limits EG of the parallel compressor 164 and the speed range of the parallel compressor 164 must be taken into consideration.

Figure 2:
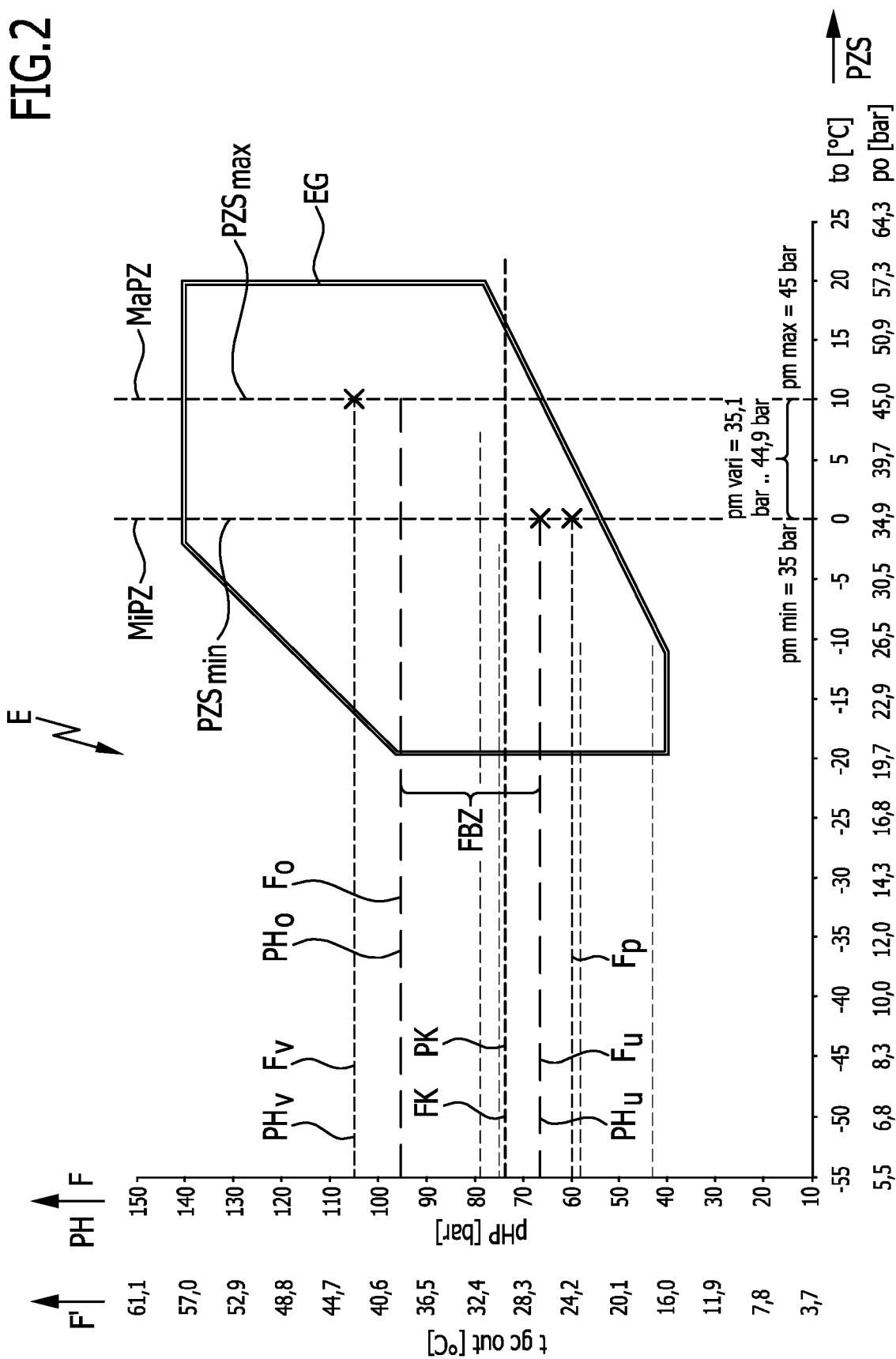
FIG. 2 a schematic operating diagram E for a parallel compressor in the parallel compression mode of operation illustrating the values of the reference variables F and the set intermediate pressure values PZS in relation to the operating limits EG.

The operating parameters for the parallel compressor 164 are illustrated in FIG. 2 in conjunction with the operating diagram E for the parallel compressor 164, wherein all the permissible pairs of values for the reference variable F such as the high pressure PH and the intermediate pressure PZ for example, must lie within the operating limits EG.

In accordance with FIG. 2, under full load, the reference variable $F_V$ such as the value $PH_V$ for the high pressure PH for example is present thereby causing the control system 40 to control the parallel compressor 164 in regard to the power thereof in such a way that it predetermines the set intermediate pressure value $PZS_{max}$ corresponding to the maximum intermediate pressure MaPZ and regulates the intermediate pressure PZ in the intermediate pressure accumulator 42 accordingly.

As the load reduces, the value of the reference variable F such as the high pressure PH for example in the refrigerant circuit 10 gets smaller.

This does not necessarily have to lead to a change of the set intermediate pressure value PZS, but rather, it will leave the set intermediate pressure value PZS at the maximum intermediate pressure MaPZ for example.

It is only when the reference variable F such as the high pressure PH for example has reached a value $F_o$ corresponding to the value $PH_o$ of the high pressure PH that the control system 40 begins to change the set intermediate pressure value PZS, namely, in the direction of the value of the minimum intermediate pressure MiPZ.

The value $F_o$ corresponding to the value $PH_o$ of the high pressure PH represents an upper limit of an intermediate-pressure-varying range of reference variables FBZ which extends from the upper reference variable value $F_o$ to a lower reference variable value $F_u$, whereby the control system 40 varies the set intermediate pressure value PZS in such a way when going through this intermediate-pressure-varying range of reference variables FBZ that the set intermediate pressure value $PZS_{min}$ corresponds to the value of the minimum intermediate pressure MiPZ upon reaching the reference variable value $F_u$ which, in this case, corresponds to the value $PH_U$ of the high pressure PH.

The intermediate-pressure-varying range of reference variables FBZ lies within a load-dependent range of reference variables FBL which comprises all the reference variables F that result from the possible load states of the refrigerant circuit 10.

If the reference variable F falls below the lower reference variable value $F_u$, then the control system 40 continues to emit the set intermediate pressure value $PZS_{min}$ for the purposes of regulating the intermediate pressure PZ.

If the reference variable F falls below a parallel-compression-limiting reference variable value $F_p$, the control system 40 recognizes the fact that the parallel compressor 164 is in danger of exceeding the operating limits EG and terminates the parallel compression mode of operation by switching off the parallel compressor 164 and activating the expansion element 134 so that the flashgas/bypass mode of operation is then effective so as to permit the reference variable F to sink below the reference variable value $F_p$ without the parallel compressor 164 becoming damaged since the auxiliary mass flow Z would then no longer be sufficiently large to operate the parallel compressor 164 in wear-free manner.

In the flashgas/bypass mode of operation, the expansion element 134 does however operate in such a way that it is in a position to maintain a constant intermediate pressure PZ close to the value $PZ_{min}$, whereby expansion of the auxiliary mass flow Z to the low pressure PN is effected.

In the description of the intermediate-pressure-varying range of reference variables FBZ, the situation relative to the load-dependent range of reference variables FBL was not specified in great detail.

Preferably, the intermediate-pressure-varying range of reference variables FBZ lies within the range of reference variables FBL in such a way that a thermodynamically critical reference variable value FK lies within the range of reference variables FBZ or that the range of reference variables FBZ lies close to the critical reference variable value FK since, in regard to the efficiency, it has proved to be expedient to vary the set intermediate pressure value PZS within a range of the reference variables F lying around the critical reference variable value FK.

In the case of the high pressure PH serving as the reference variable F, the critical reference variable value FK corresponds to the thermodynamically critical pressure PK of the refrigerant.

As is likewise evident from FIG. 2, the temperature at the output of the high pressure side heat exchanger 34 for example can also be drawn upon as a reference variable F'.

In this case, the critical reference variable value FK is the thermodynamically critical temperature TK of the refrigerant.

The relationship between the reference variable F and the set intermediate pressure value PZS within the range of reference variables FBZ has not as yet been specified in greater detail. As is apparent from FIGS. 3 to 6, the most diverse of variants is possible.

Figure 3:
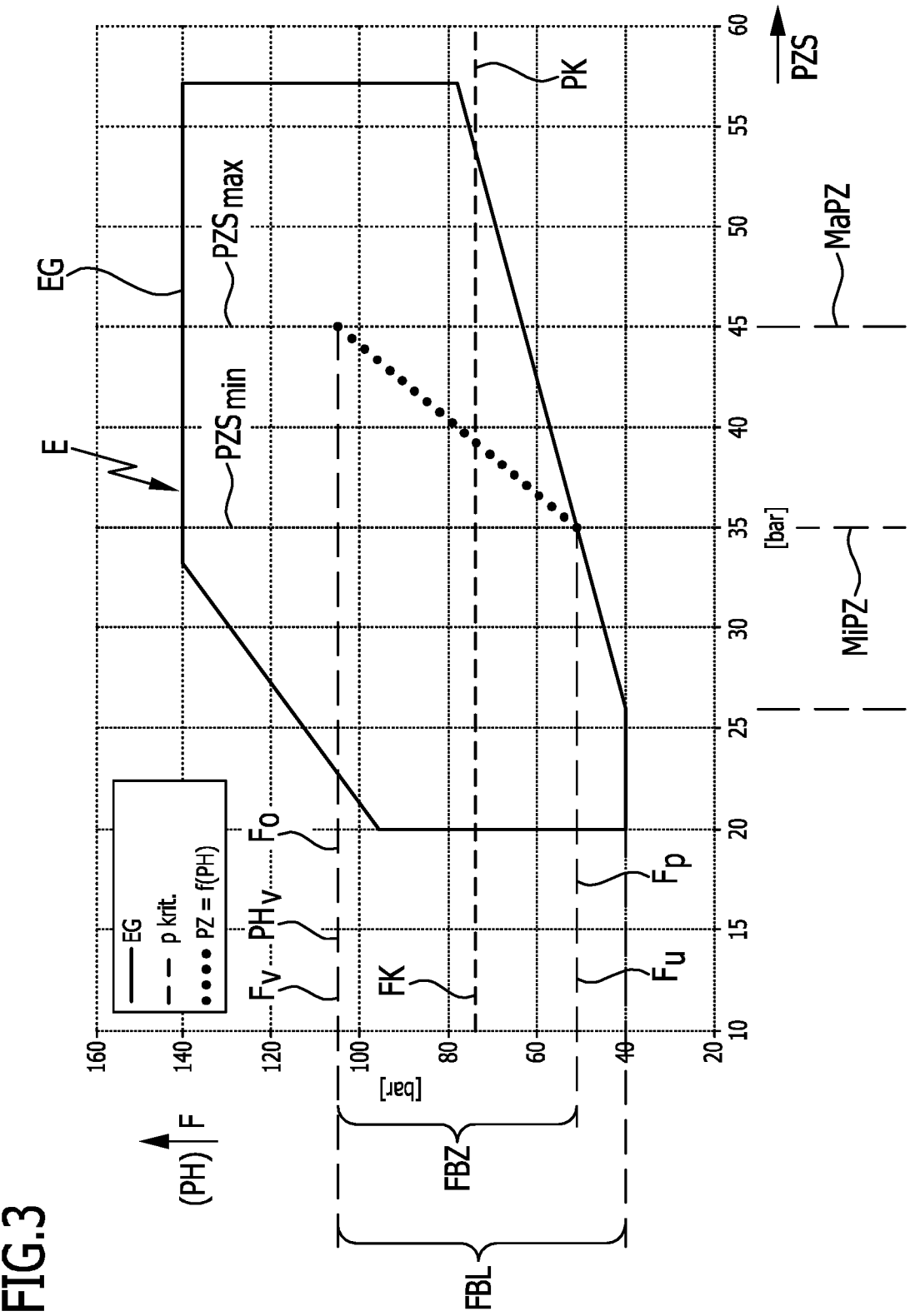
FIG. 3 an illustration corresponding to FIG. 2 illustrating a first variant of the relationship between the reference variables and the set intermediate pressure value.

In the case of the first variant which is illustrated in FIG. 3, the intermediate pressure-varying range of reference variables FBZ extends from the reference variable $F_v$ under full load up to the reference variable value $F_u$ which lies below the critical reference variable FK so that the reference variable $F_v$ coincides with the upper reference variable value $F_o$ and the parallel-compression-limiting reference variable $F_p$ coincides with the lower reference variable value $F_u$.

Furthermore, there is a linear relationship between the value of the reference variable F and the set intermediate pressure value PZS within the range of reference variables FBZ so that the increase or the decrease of the reference variable F has a proportionate effect upon the set intermediate pressure value PZS.

Figure 4:
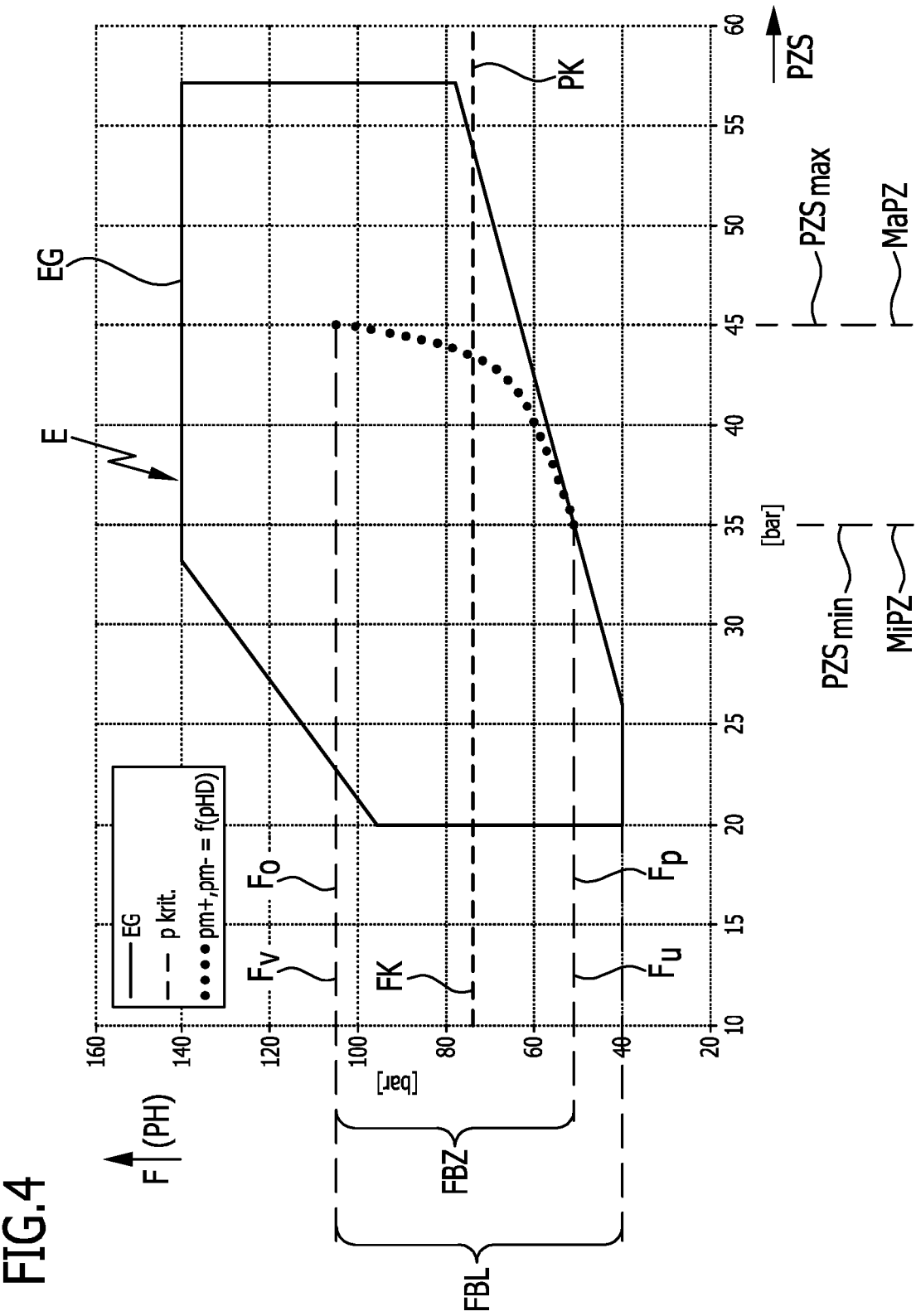
FIG. 4 an illustration corresponding to FIG. 2 illustrating a second variant of the relationship between the reference variables and the set intermediate pressure value.

In a second variant which is illustrated in FIG. 4, the range of reference variables FBZ is arranged in the same way as for the first variant, but here however there is a nonlinear relationship between the reference variable F and the set intermediate pressure value PZS such as a more complex exponential/linear relationship for example.

Figure 5:
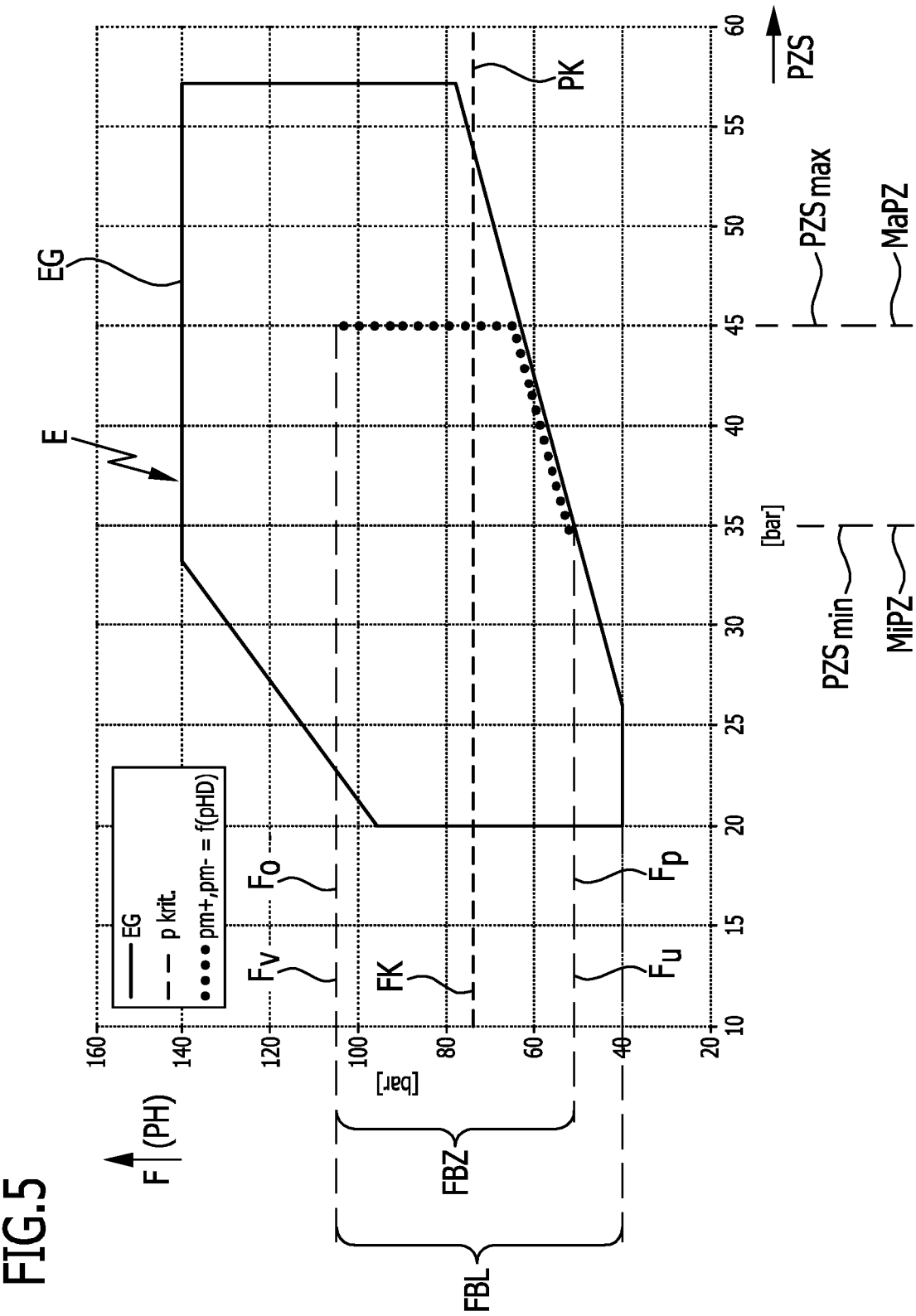
FIG. 5 an illustration similar to FIG. 4 of a third variant of the relationship between the reference variables and the set intermediate pressure value.

A third variant that is illustrated in FIG. 5 is based on the second variant, wherein the relationship between the reference variable F and the set intermediate pressure value PZS is predetermined by the lower operating limit EG of the operating diagram E of the parallel compressor 164 extending between the value $PZS_{min}$ and the value $PZS_{max}$ since, in the case of the third variant, the values of the set intermediate pressure value PZS are predetermined such that although they do indeed lie between the value $PZS_{min}$ and the value $PZS_{max}$ within the operating limits EG, they now lie close to the characteristic curve of the lower operating limits EG (i.e. the operating limits EG of the operating diagram E for the lowest values of the reference variable F).

Upon reaching the value $PZS_{max}$, this value is then maintained even in the event of a reference variable F which continues to rise.

This means that in the third variant in accordance with FIG. 5, in the event that a variation between the value $PZS_{min}$ and the value $PZS_{max}$ is possible, the set intermediate pressure value PZS is selected to be as large as possible commencing from low values of the reference variable F such as beginning at the values $F_p$ for example, although always within the operating limits E.

Figure 6:
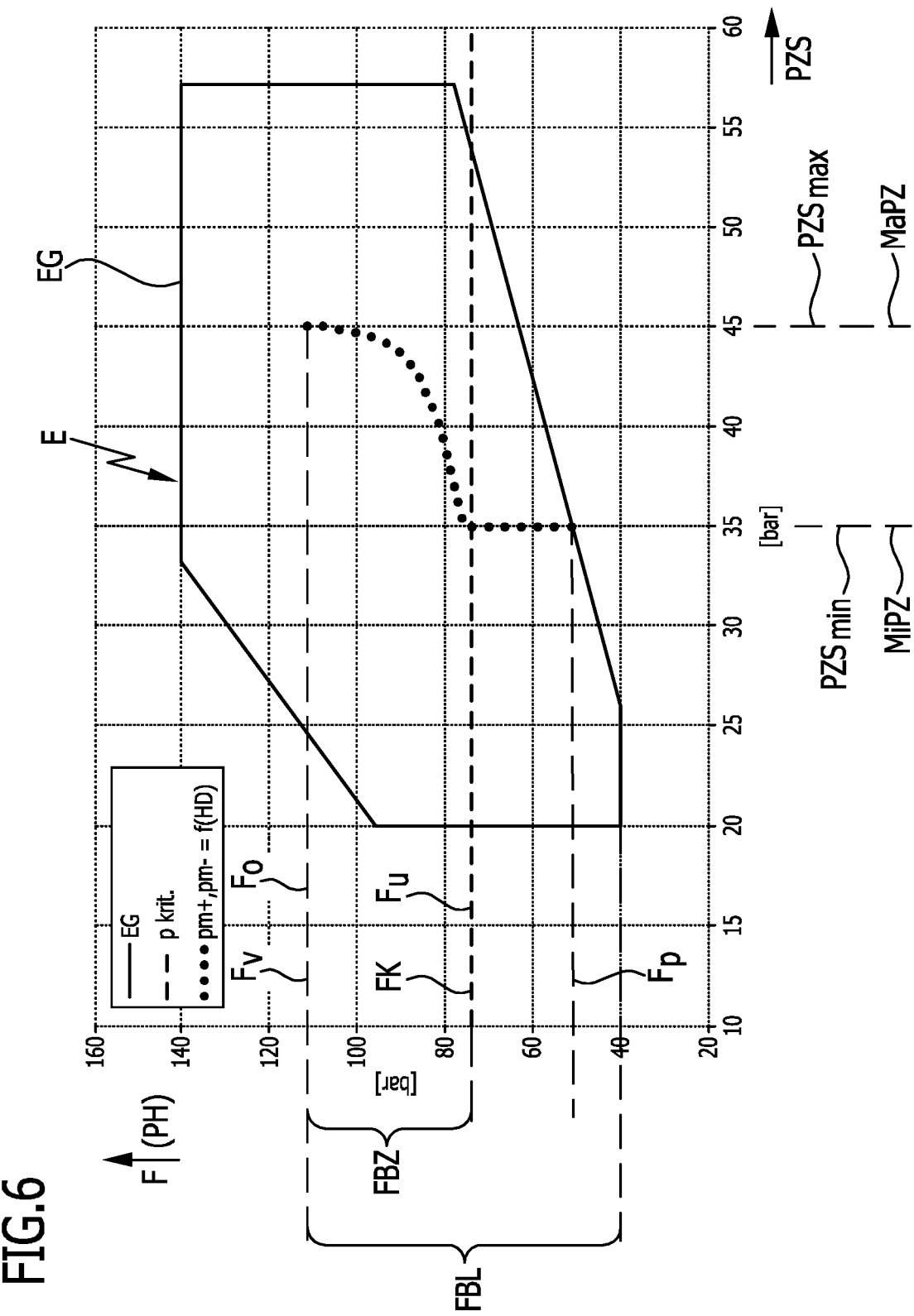
FIG. 6 an illustration corresponding to FIG. 2 illustrating a fourth variant of the relationship between the reference variables and the set intermediate pressure value.

In a fourth variant which is illustrated in FIG. 6, the range of reference variables FBZ extends from the reference variable $F_v$ up to the critical reference variable FK and the relationship between the reference variable F and the set intermediate pressure value is nonlinear such as exponential for example.

In this case the control system 40 keeps the set intermediate pressure value PZS constant at the minimum set intermediate pressure value $PZS_{min}$ for values of the reference variable F between the lower reference variable value $F_u$ and the parallel-compression-limiting reference variable value $F_p$.

Figure 7:
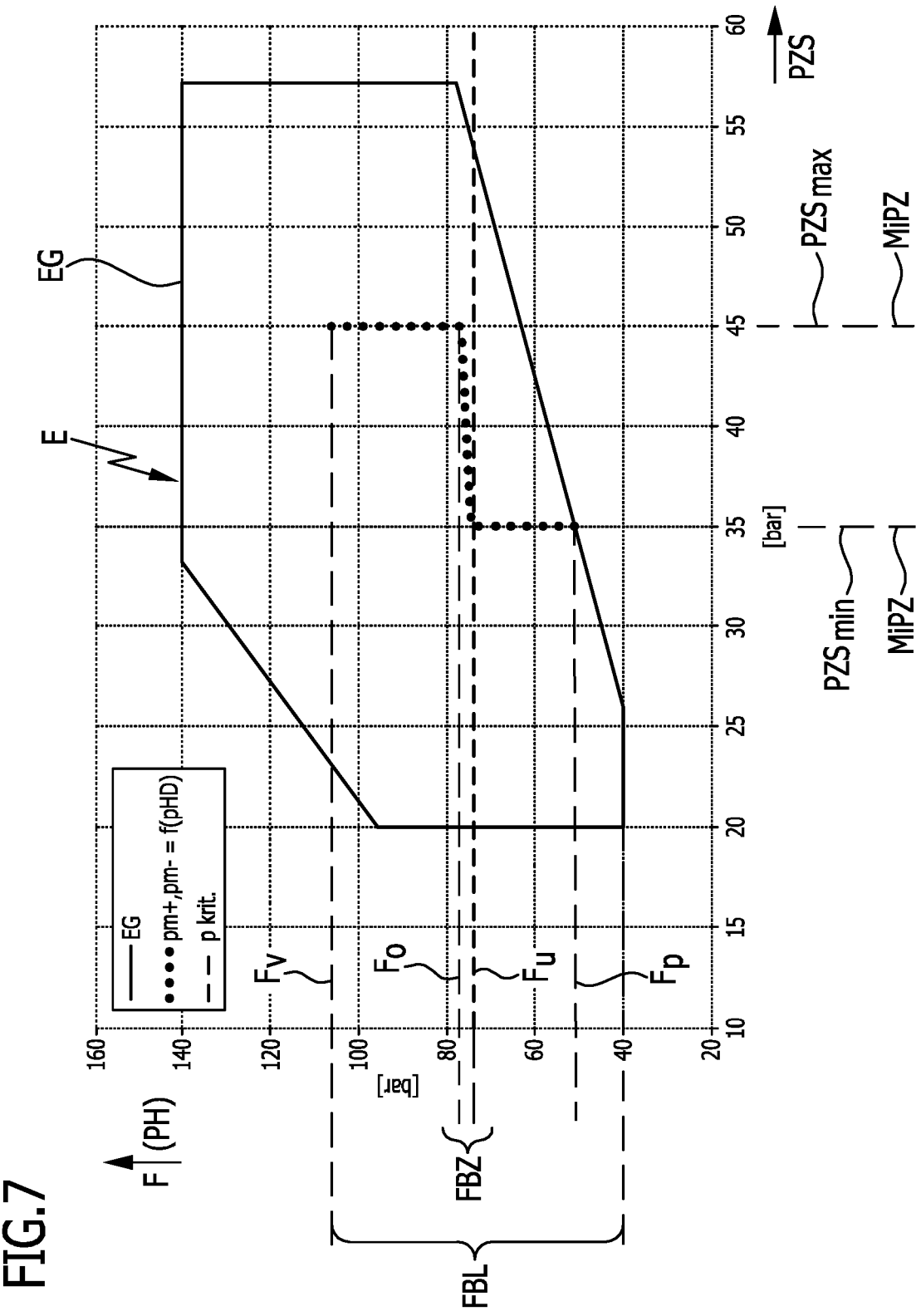
FIG. 7 an illustration corresponding to FIG. 2 illustrating a fifth variant of the relationship between the reference variables and the set intermediate pressure value.

In a fifth variant which is illustrated in FIG. 7, the range of reference variables FBZ is restricted to a narrow range adjoining the critical reference variable FK so that, for values of the reference variable F lying above the critical reference variable FK and having an approximately linear relationship to the set intermediate pressure value PZS, the set intermediate pressure value PZS is varied between the value $PZS_{min}$ and $PZS_{max}$ in the event of slight changes in the value of the reference variable F, but is then held constant between the upper reference variable value $F_o$ and the reference variable value $F_v$ corresponding to a full load as well as between the lower reference variable value $F_u$ and the reference variable $F_p$.

The implementation of the process for optimizing the set intermediate pressure value PZS in dependence on the reference variable F by the control system 40 is preferably dependent on the size of the auxiliary mass flow Z which arises for the parallel compressor 164 in the intermediate pressure accumulator 42 for compression purposes, hereby, one assumes for example, that the size of the auxiliary mass flow Z decreases in the event of an increase of the set intermediate pressure value PZS whilst the load conditions of the system remain the same and the heat sink temperatures remain the same.

If the size of the auxiliary mass flow Z is too small, then there is a danger that the parallel compressor 164 will be damaged, or the operating conditions of the refrigerating system will vary disadvantageously due to the process of switching between the parallel compression and flashgas/bypass mode of operation.

For this reason, it is preferable that provision be made for the rotational speed of the parallel compressor 164 to be monitored by the control system 40 by means of a rotational speed detector D (FIG. 1) which is associated with the frequency converter FU and, upon the rotational speed dropping to a predetermined minimum rotational speed, suspending implementation of the process of optimizing the set intermediate pressure value PZS by the control system 40 until such time as the rotational speed of the parallel compressor 164 is again higher than the predetermined minimum rotational speed.

Thereby, the predetermined minimum speed does not have to correspond to the minimum permissible rotational speed of the parallel compressor, but rather, it could also be different therefrom, for example, be selected to be higher than it depending upon how the relationships prevailing in the refrigeration system have been configured or upon which operational states could arise.

Figure 8:
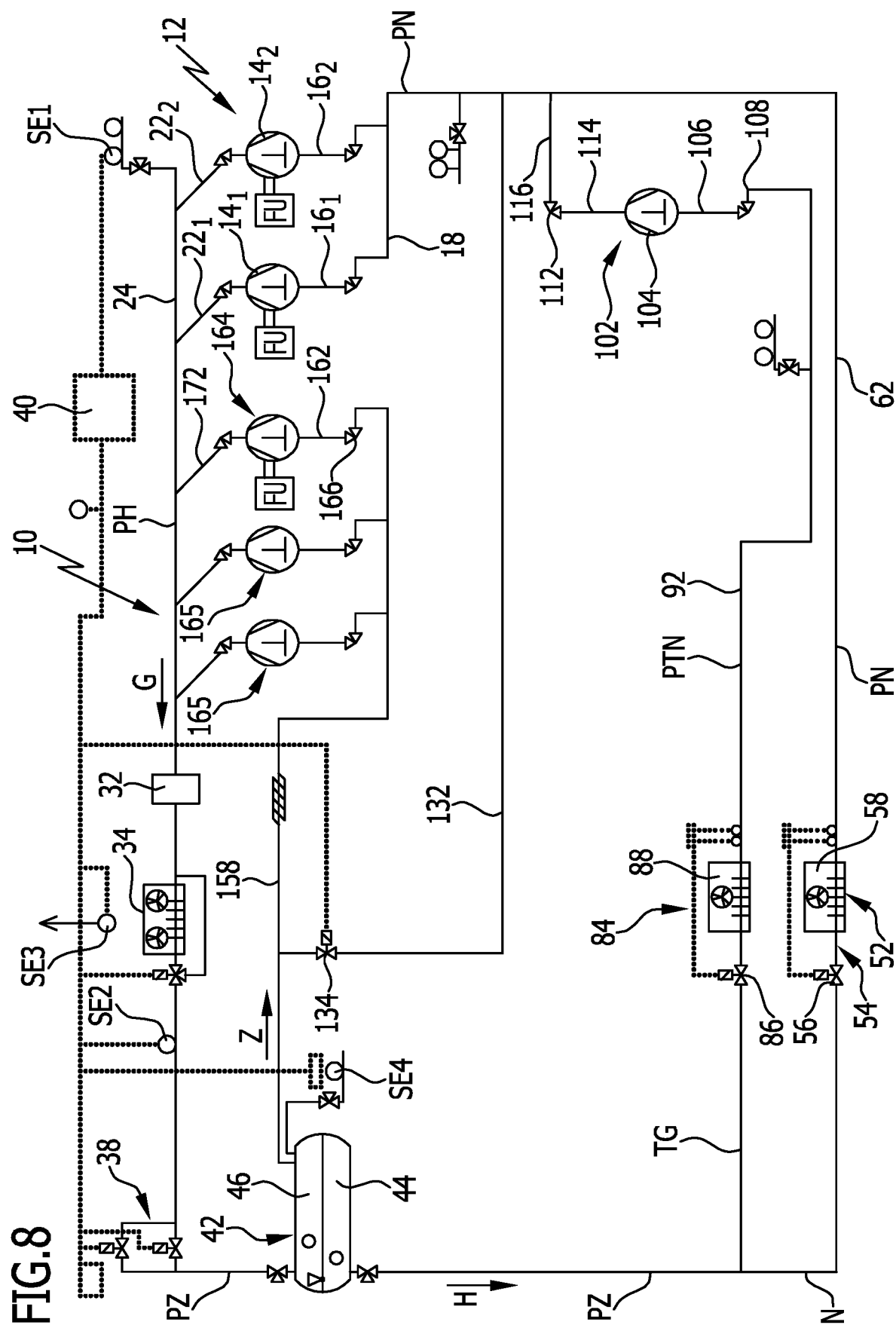
FIG. 8 an illustration of a second exemplary embodiment of a refrigeration system in accordance with the invention.

In a second exemplary embodiment that is illustrated in FIG. 8, there are provided in addition to the parallel compressor 164 one or more further parallel compressors 165 which, for example, work at a fixed rotational speed and—if switched on—furnish a specified compressor line that is determined by their rotational speed and to which the power of the rotational-speed-variable parallel compressor 164 that is being regulated in speed by the frequency converter FU is added.

In order to prevent one or more of the parallel compressors 165 being switched on and off in briefly succeeding time intervals, a process of detecting the opening degree of the expansion element 38 is effected on the part of the control system 40 and, upon the opening degree falling to a predetermined minimum value MO, the process of optimizing the set intermediate pressure value PZS is suspended by the control system 40 until such time as the opening degree of the expansion element of 38 has again reached higher values.

Figure 9:
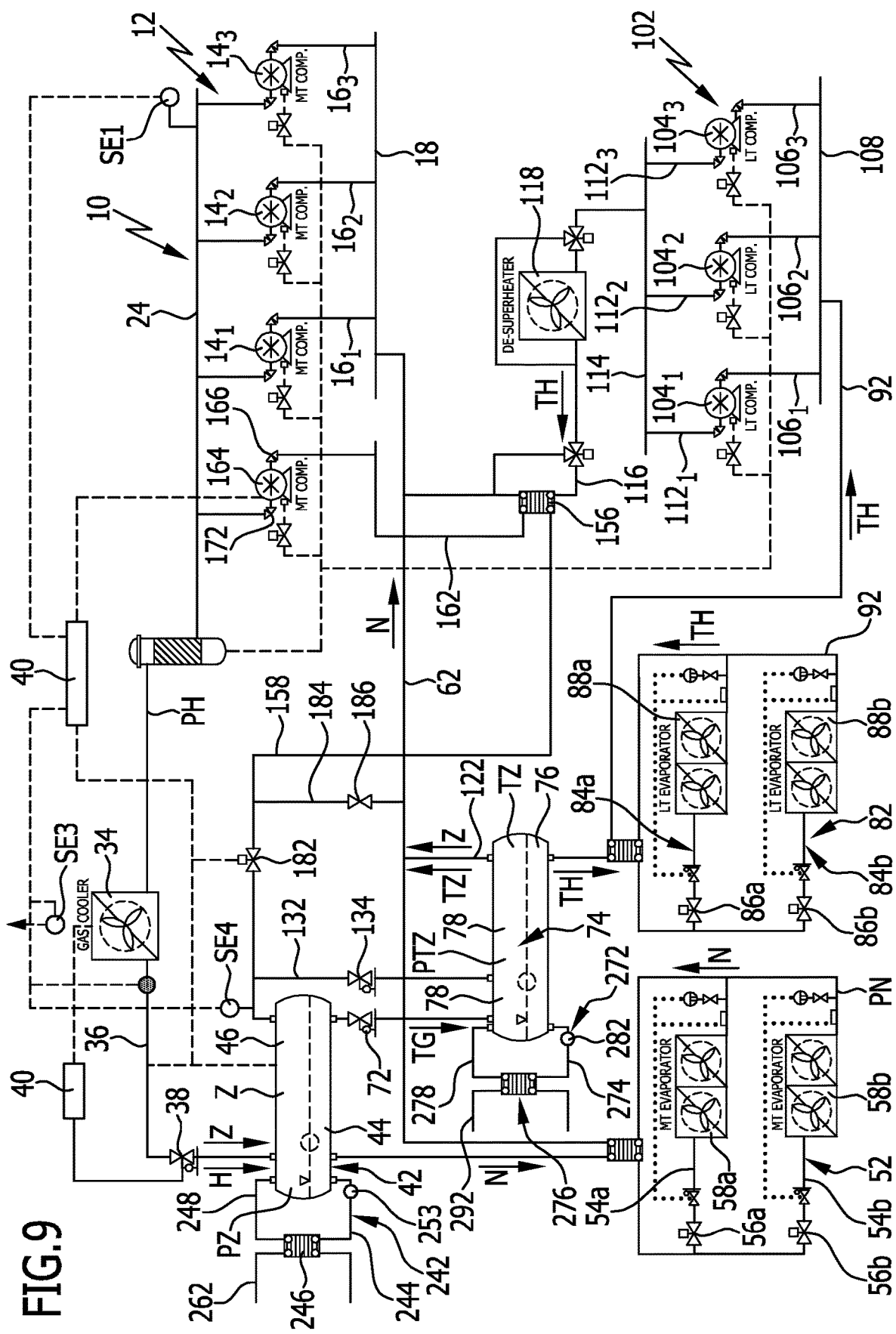
FIG. 9 a schematic illustration of a third exemplary embodiment of a refrigeration system in accordance with the invention.

In the third exemplary embodiment of the refrigeration system in accordance with the invention that is illustrated in FIG. 9, the refrigerant compressor unit which is designated as a whole by 12 comprises three refrigerant compressors $14_1$ to $14_3$ for example which are all arranged to work in parallel in the refrigerant compressor unit 12.

Each of the refrigerant compressors $14_1$ to $14_3$ comprises a suction-side connector $16_1$ to $16_3$, wherein all the suction-side connectors 16 of the individual refrigerant compressors 14 are connected to a suction connector line 18 of the refrigerant compressor unit 12.

Furthermore, each of the refrigerant compressors 14 comprises a pressure-side connector $22_1$ to $22_3$, wherein all of the pressure-side connectors 22 of the individual refrigerant compressors 14 are connected to a pressure connector line 24 of the refrigerant compressor unit 12.

Thus, all three refrigerant compressors 14 work in parallel, but it is possible however for the compression power of the refrigerant compressor unit 12 to be varied by causing some of the individual refrigerant compressors 14 to work and some of the individual refrigerant compressors 14 not to work.

Furthermore, it is possible for the compression power of the refrigerant compressor unit 12 to be controlled by controlling a rotational speed in variable manner by either controlling one of the working refrigerant compressors 14 or controlling the rotational speed of individual working refrigerant compressors 14.

In the third exemplary embodiment, a normal refrigerating mass flow N in the form of a partial mass flow of the main mass flow H flows out of the intermediate pressure accumulator 42 from the main mass flow H forming the bath 44 of liquid refrigerant to the normal refrigerating stage which is designated as a whole by 52 and comprises one or more, two for example, parallel arranged and identically constructed normal refrigerating expansion units 54a and 54b.

Not only is the normal refrigerating mass flow N branched off as a partial flow from the main mass flow H in the intermediate pressure accumulator 42 but, as a further partial flow, so too is a deep-freezing overall mass flow TG which is supplied to a deep-freezing intermediate pressure expansion unit 72 which is likewise in the form of an expansion element or an expansion valve for example.

Expansion of the deep-freezing overall mass flow TG to a deep-freezing intermediate pressure PTZ which preferably corresponds to the low pressure PN and lies between 25 bar and 30 bar for example is effected by the deep-freezing intermediate pressure expansion unit 72 so that, from the deep-freezing overall mass flow TG consisting of liquid refrigerant, there ensues a deep-freezing main mass flow TH at a temperature lying below the temperature of the main mass flow as well as a deep-freezing auxiliary mass flow TZ consisting of vaporous refrigerant which are supplied together to a deep-freezing intermediate pressure accumulator 74, wherein the deep-freezing intermediate pressure accumulator 74 comprises a reservoir for both the deep-freezing main mass flow TH and for the deep-freezing auxiliary mass flow TZ, stores them and separates them from each other, whereby the deep-freezing main mass flow TH is formed as a bath 76 of liquid refrigerant, whilst the deep-freezing auxiliary mass flow TZ forms a gas volume 78 consisting of gaseous refrigerant that is located above the bath 76 in the deep-freezing intermediate pressure accumulator 74.

Consequently, a process of separating the deep-freezing main mass flow TH from the deep-freezing auxiliary mass flow TZ is effected in the deep-freezing intermediate pressure accumulator 74.

Commencing from the deep-freezing intermediate pressure accumulator 74, the deep-freezing main mass flow TH is supplied to a deep-freezing stage 82 which comprises one or more, two for example, parallel deep-freezing expansion units 84 that are connected in parallel, wherein each of these deep-freezing expansion units 84 comprises a deep-freezing expansion element 86 which expands a portion of the deep-freezing mass flow TH from the deep-freezing intermediate pressure PTZ to a deep-freezing low pressure PTN and thus cools it down, whereby the deep-freezing low pressure PTN is kept as constant as possible in all operational states and, for example, lies between 10 bar and 15 bar, wherein the deviations amount to a maximum of ±3 bar.

The refrigerant that has been cooled down to the deep-freezing low pressure PTN is then subsequently supplied to a deep-freezing low-pressure-side heat exchanger 88 and, in the respective deep-freezing heat exchanger 88, it is in a position to absorb heat at deep-freezing temperatures whereby the enthalpy is increased.

The deep-freezing main mass flow TH that has been expanded as a whole in the deep-freezing stage 82 to the deep-freezing low pressure PTN is supplied to a deep-freezing suction line 92 which is connected to both of the deep-freezing heat exchangers 88 and supplies the deep-freezing main mass flow TH that has been expanded to the deep-freezing low pressure PTN to a deep-freezing compressor unit that is designated as a whole by 102 which, for example, comprises a plurality of deep-freezing compressors $104_1$ to $104_3$ that are working in parallel and comprise respective suction-side connectors $106_1$ to $106_3$ which are connected to a deep-freezing suction connector 108 of the deep-freezing compressor unit 102 which, for its part, is in turn connected to the deep-freezing suction line 92 and receives the deep-freezing main mass flow TH that has been expanded to the deep-freezing low pressure PTN.

Furthermore, the deep-freezing compressors 104 comprise pressure side connectors $112_1$ to $112_3$ which, for their part, are in turn connected to a deep-freezing pressure connector line 114 of the deep-freezing compressor unit 102.

The deep-freezing compressor unit 102 compresses the deep-freezing main mass flow TH which has flowed through the deep-freezing stage 82 and has been expanded to the deep-freezing low pressure PTN back to the normal refrigerating low pressure PN, whereby the deep-freezing mass flow TH that has been compressed to the normal refrigerating low pressure PN is supplied via the line 116 to the suction connector line 18 of the refrigerant compressor unit 12.

If so required, yet another heat exchanger 118 which permits a possibly expedient cooling of the compressed deep-freezing main mass flow TH is selectively insertible into the line 116.

In the previous explanation of the functioning of the third exemplary embodiment of the refrigerant circuit 10, no indications have been given as to how the deep-freezing auxiliary mass flow TZ and the auxiliary mass flow Z are conveyed.

In order to remove the deep-freezing auxiliary mass flow TZ which is present in the deep-freezing intermediate pressure accumulator 74 at the deep-freezing intermediate pressure PTZ so as to keep the deep-freezing intermediate pressure PTZ as constant as possible, the deep-freezing intermediate pressure accumulator 74 is provided with a removal line 122 which connects the gas volume 78 in the deep-freezing intermediate pressure accumulator 74 to the suction line 62 which leads from the normal refrigerating stage 52 to the suction connector 18 of the refrigerant compressor unit 12.

Thus, the deep-freezing intermediate pressure PTZ corresponds approximately to the normal refrigerating low pressure PN.

In order to remove the auxiliary mass flow Z from the intermediate pressure accumulator 42 and to keep the intermediate pressure PZ as constant as possible, a removal line 132 opens out into the gas volume 46 of the intermediate pressure accumulator 42 on the one hand and into the gas volume 78 in the deep-freezing intermediate pressure accumulator 74 on the other, whereby there is additionally provided in the removal line 132 yet another expansion element 134 which expands the auxiliary mass flow Z emerging from the intermediate pressure accumulator 42 from the intermediate pressure PZ to the deep-freezing intermediate pressure PTZ and hence from the saturated gaseous phase in the wet steam region and thus effects additional cooling thereof so that the auxiliary mass flow Z continues to be cooled down whilst producing liquid before it enters the deep-freezing intermediate pressure accumulator 74.

The expansion element 134 regulates the intermediate pressure PZ in the intermediate pressure accumulator 42 to a predetermined value.

The volume of the bath 44 consisting of liquid refrigerant in the intermediate pressure accumulator 42 and the volume of the bath 76 consisting of liquid refrigerant in the deep-freezing intermediate pressure accumulator 72 are set by the deep-freezing intermediate pressure expansion unit 72 in such a way that the bath 74 has a sufficiently large volume on the one hand and that the bath 44 likewise has a sufficiently large volume on the other.

In particular, provision is made for the portion of the auxiliary mass flow Z that has been expanded by the expansion element 134, the gas volume 78 in the deep-freezing intermediate pressure accumulator 74, to be supplied at a deposition height of 300 mm to 400 mm above the constructionally determined maximally attainable liquid level of the bath 76 of the deep-freezing main mass flow TH in the deep-freezing intermediate pressure accumulator 74.

By using a supply process of this type for the expanded auxiliary mass flow Z, one can count on a greater probability of there being sufficiently adequate separation of the liquid phase in the deep-freezing intermediate pressure accumulator 74.

Hereby, the inlet of the removal line 132 into the deep-freezing intermediate pressure accumulator 74 is located such that the auxiliary mass flow Z entering the deep-freezing intermediate pressure accumulator 74 is sufficiently far from the removal line 122, in particular, from an inlet of the removal line 122 into the deep-freezing intermediate pressure accumulator 74 as to ensure that the accompanying liquid component which is formed by the cooling process resulting from the process of expansion in the expansion element 134 separates out from the auxiliary mass flow Z in the gas volume 78 of the deep-freezing intermediate pressure accumulator 74 that was cooled by the expansion element 134 in the deep-freezing intermediate pressure accumulator 74 and then, in turn, the remaining gaseous auxiliary mass flow Z subsequently enters the suction line 62 through the removal line 122.

The auxiliary mass flow Z' flowing through the removal line 122 is thereby reduced by the mass of the liquid component of the auxiliary mass flow Z which was separated out in the deep-freezing intermediate pressure accumulator 74 and which is certainly in the region of less than 10% so that the auxiliary mass flow Z' approximately corresponds to the auxiliary mass flow Z.

Thus, not only does the deep-freezing auxiliary mass flow TZ flow through the removal line 122, but so too does the substantially gaseous component of the auxiliary mass flow Z that is fed through the gas volume 78 in the deep-freezing intermediate pressure accumulator 74, both of which then enter the suction line 62.

Preferably, the liquid component of the auxiliary mass flow flowing through the removal line 122, namely, the deep-freezing auxiliary mass flow TZ and the auxiliary mass flow Z', amounts in toto to less than 5 m-% (mass percent), still better to less than 3 m-% and preferably to less than 1-m % of the total mass flows passing through the removal line 122 so that it is ensured that the refrigerant compressors 14 of the refrigerant compressor unit 10 suck in substantially liquid-free refrigerant in all operational states.

The data relating to the mass flows is an average value which occurs when the refrigerating circuit 10 is operational in the described manner during the respective periods of operation.

Separation of the liquid components of the auxiliary mass flow Z in the gas volume 78 of the deep-freezing intermediate pressure accumulator 74 can be achieved in a particularly advantageous manner if the flow rate of the refrigerant in the removal line is less than 2 m/s (meters per second), still better less than 0.5 m/s and preferably less than 0.3 m/s.

In contrast to the first exemplary embodiment, provision is made in the third exemplary embodiment for an on-off valve 182 to be located in the receiving line 158 which enables admission of refrigerant from the gas volume 46 of the intermediate pressure accumulator 42 to be prevented.

In addition, there is provided between the on-off valve 182 and a heat exchanger 156 that is arranged between the receiving line 158 and the suction line 162 on the one hand as well as in the line 116 on the other hand a connecting line 184 to the suction line 62 which branches out of the receiving line 158 in which there is provided a non-return valve that is designated as a whole by 186 which only permits a flow of refrigerant from the suction line 62 in the direction of the receiving line 158.

By closing the on-off valve 182, it is possible to assist the refrigerant compressors 14 of the refrigerant compressor unit 12 in regard to the compression power thereof when the parallel compressor 164 is operational since, in this case, refrigerants can be sucked out of the suction line 62 into the receiving line 158 via the non-return valve 186 and can be supplied over the suction line 162 to the preferably speed regulated parallel compressor 164 which thus works in parallel with the refrigerant compressors 14 of the refrigerant compressor unit 12, whereby one of the refrigerant compressors 14 is preferably likewise speed regulated so that in toto there are two power-regulated or speed regulated refrigerant compressors available.

Furthermore, there is provided the control system 40 which controls the on-off valve 182 on the one hand and the parallel compressor 164 on the other, namely, in accord with the current load states.

Thus, when the system is operating at full load such as in the summer for example, the refrigerant circuit 10 is operated in such a manner that the high pressure PH lies at approximately 90 bar for example.

Furthermore, the low pressure PN is at approximately 25 bar for example.

In this case, the parallel compressor 164 works in the parallel compression mode of operation when the on-off valve 182 is opened so that the entire auxiliary mass flow Z is supplied over the receiving line 158, the heat exchanger 156 and the suction line 162 to the suction connector 166 of the parallel compressor 164 which then compresses the auxiliary mass flow to the high pressure PH which is present on the pressure connector 172 thereof.

However, in the lowest partial-load mode of operation, such as in the winter for example, the high pressure PH is lowered to 40 bar for example. In this case, the on-off valve 182 is closed by the control system 192 and the parallel compressor 164 works in the flashgas/bypass mode of operation in parallel with the refrigerant compressor unit 12 whereby to this end, the refrigerant is sucked out of the suction line 62 into the receiving line 158 via the branch line 184 and the non-return valve 186, flows through the heat exchanger 156 and is supplied via the suction line 162 to the suction connector 166 of the parallel compressor 164.

In this case, the auxiliary mass flow Z flows via the expansion element 134 which is arranged in the removal line 132 from the gas volume 46 in the intermediate pressure accumulator 42 into the gas volume 78 of the deep-freezing intermediate pressure accumulator 74, whereby, in the gas volume 78 in the deep-freezing intermediate pressure accumulator 74, precipitation of liquid resulting from the expansion of the auxiliary mass flow Z is deposited in the deep-freezing intermediate pressure accumulator 74.

Thus, in the flashgas/bypass mode of operation, the parallel compressor 164 sucks refrigerant from the suction line 62 at the low pressure PN and compresses the refrigerant to the high pressure PH which in this case however only lies in the region of 45 bar for example.

Figure 10:
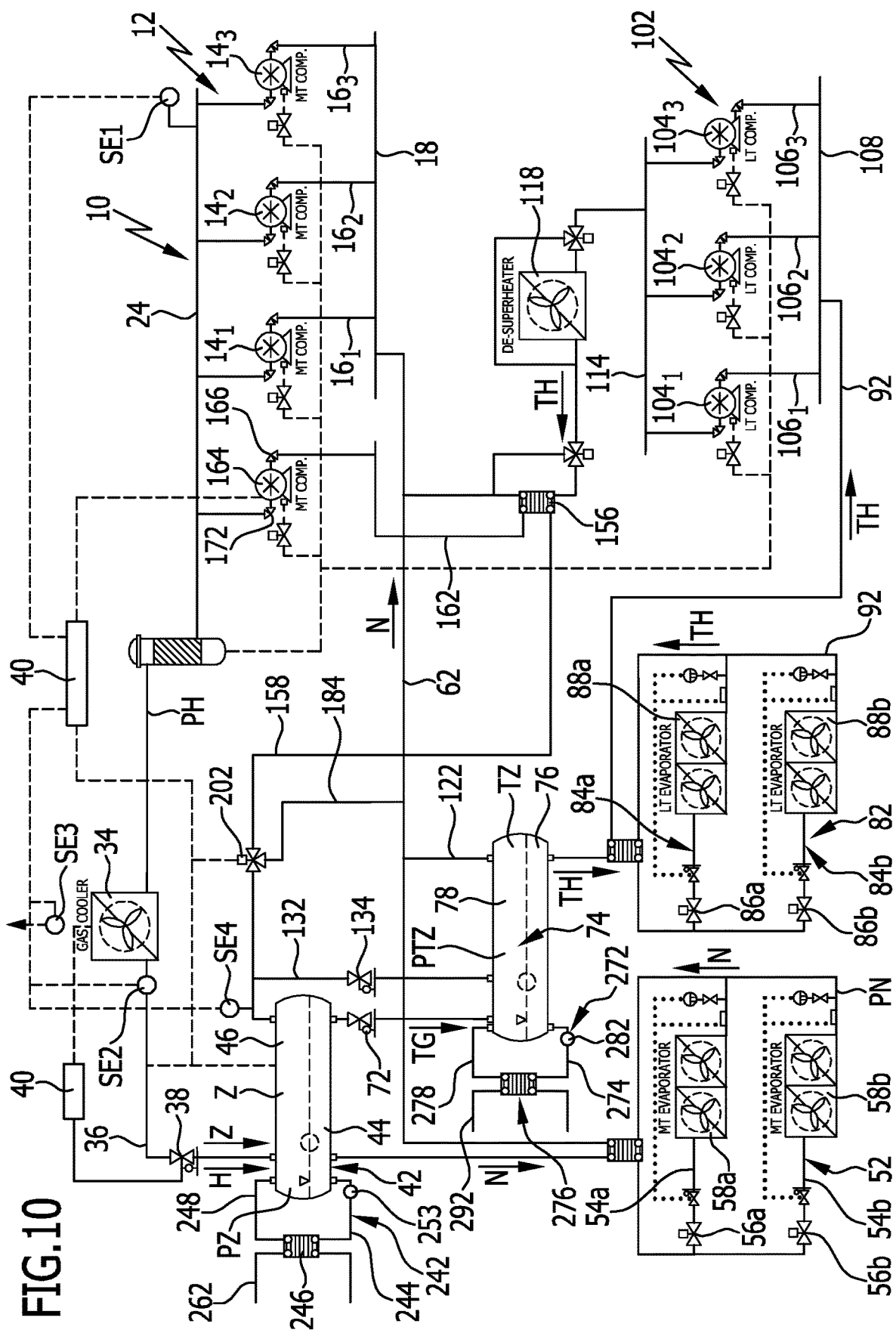
FIG. 10 an illustration of a fourth exemplary embodiment of a refrigeration system in accordance with the invention.

In a fourth exemplary embodiment of a refrigeration system in accordance with the invention which is illustrated in FIG. 10, those elements which are identical to those of the preceding exemplary embodiments are provided with the same reference symbols so that in this respect reference should be made to the full content of the expositions provided for the preceding exemplary embodiments.

In contrast to the third exemplary embodiment, there is provided in place of the on-off valve 182 in the receiving line 158 a three-way valve 202 which is able to connect either the branch line 184 to the receiving line 158 and to interrupt the connection between the receiving line 158 and the removal line 132 or to establish the connection between the receiving line 158 and the removal line 132 and instead, to interrupt the relationship between the branch line 184 and the receiving line 158.

Hereby, this three-way valve 202 is likewise controllable by the control system 40 which, moreover, also controls the parallel compressor 164 in the same way as was described in connection with the third exemplary embodiment, whereby now, control of the three-way valve 202 is effected in place of the control of the on-off valve 182.

Figure 11:
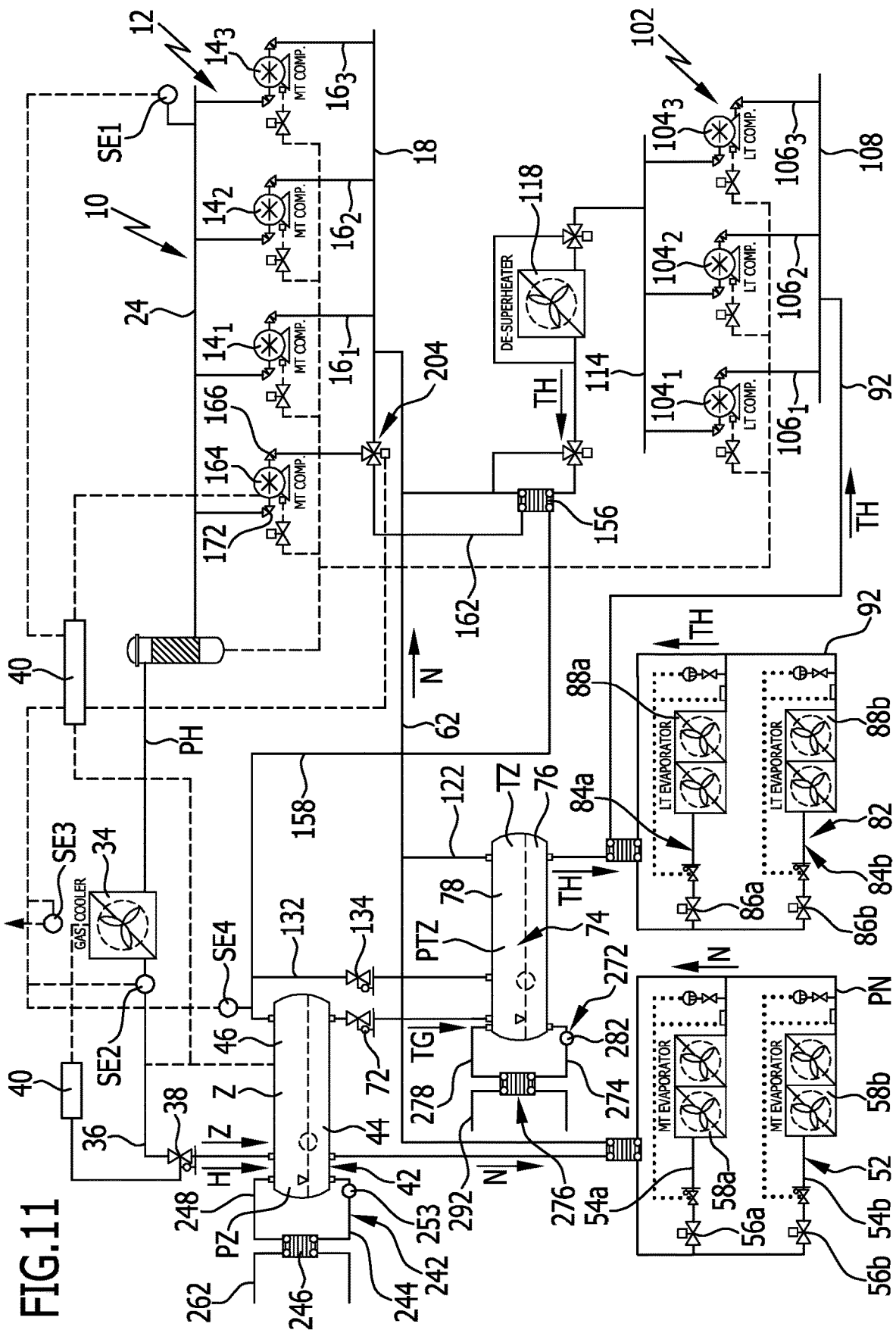
FIG. 11 an illustration of a fifth exemplary embodiment of a refrigeration system in accordance with the invention.

In a fifth exemplary embodiment of a refrigeration system in accordance with the invention which is illustrated in FIG. 11, those elements which are identical to those of the preceding exemplary embodiments are provided with the same reference symbols so that in this respect reference should be made to the full content of the expositions provided for the preceding exemplary embodiments.

Differing from the fourth exemplary embodiment, there is provided in place of the three-way valve 202 a three-way valve 204 which is connected on the one hand to the suction connector line 18 and to the suction line 162 on the other and is in a position to connect one of these lines 18 or 162 to the suction connector 166 of the parallel compressor 164.

Thus, the three-way valve 204 creates the possibility of supplying the parallel compressor 164 when in the parallel compression mode of operation with either a part of the auxiliary mass flow Z or the entire auxiliary mass flow Z via the suction line 162, the heat exchanger 156 and the receiving line 158 or of supplying, for compressing purposes, the parallel compressor 164 when in the flashgas/bypass mode of operation with expanded refrigerant from the normal refrigerating mass flow N and the deep-freezing main mass flow TH via the suction connector line 18.

Hereby, the three-way valve 204 is likewise controllable by the control system 40 which moreover also controls the parallel compressor 164 in the same way as was described in connection with the fourth exemplary embodiment, whereby, in place of controlling the on-off valve 182, control of the three-way valve 204 is effected in order to realize the same operational states.

Figure 12:
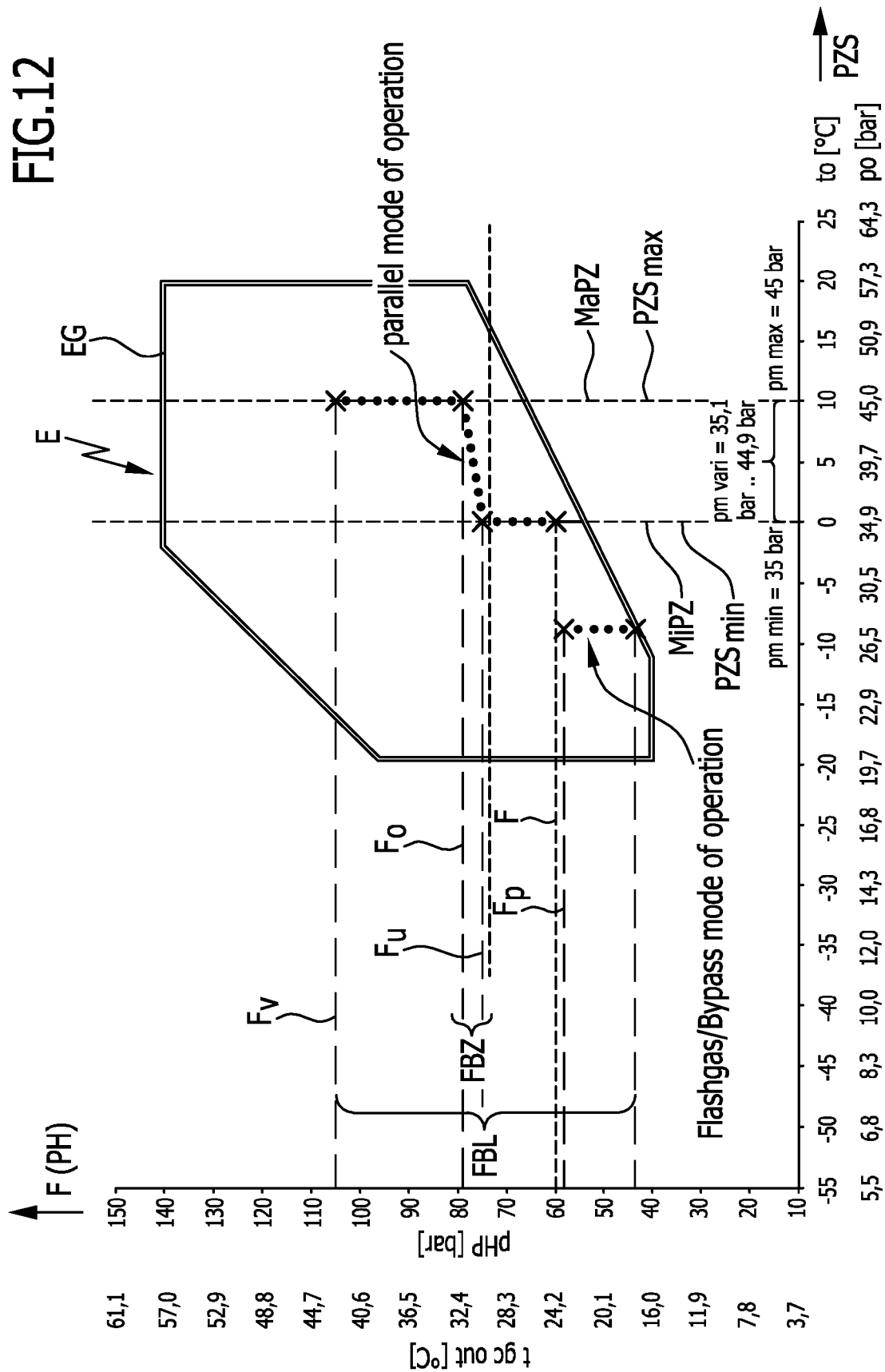
FIG. 12 a schematic operating diagram E for a parallel compressor in the parallel compression mode of operation illustrating the values of the reference variables F and the set intermediate pressure values PZS in relation to the operating limits EG and FIG. 13 a schematic illustration of a building with a refrigeration system in accordance with the invention.

In the third to fifth exemplary embodiments, the parallel compressor 164 is not switched off by the control system 40 for values of the reference variable F below the parallel-compression-limiting reference variable $F_p$ in the flashgas/bypass mode of operation, but rather is used to provide support for the refrigerant compressor unit 12 and thereby compresses refrigerants from the normal refrigerating mass flow N and the deep-freezing mass flow TH from the low pressure PN to the high pressure PH, something which is possible to effect in damage-free manner as indicated by the operating diagram E—as illustrated in FIG. 12.

Moreover, in the parallel compression mode of operation, the control system 40 determines set intermediate pressure values PZS in dependence on the reference variable F in analogy with the fourth variant in accordance with the first exemplary embodiment.

Figure 13:
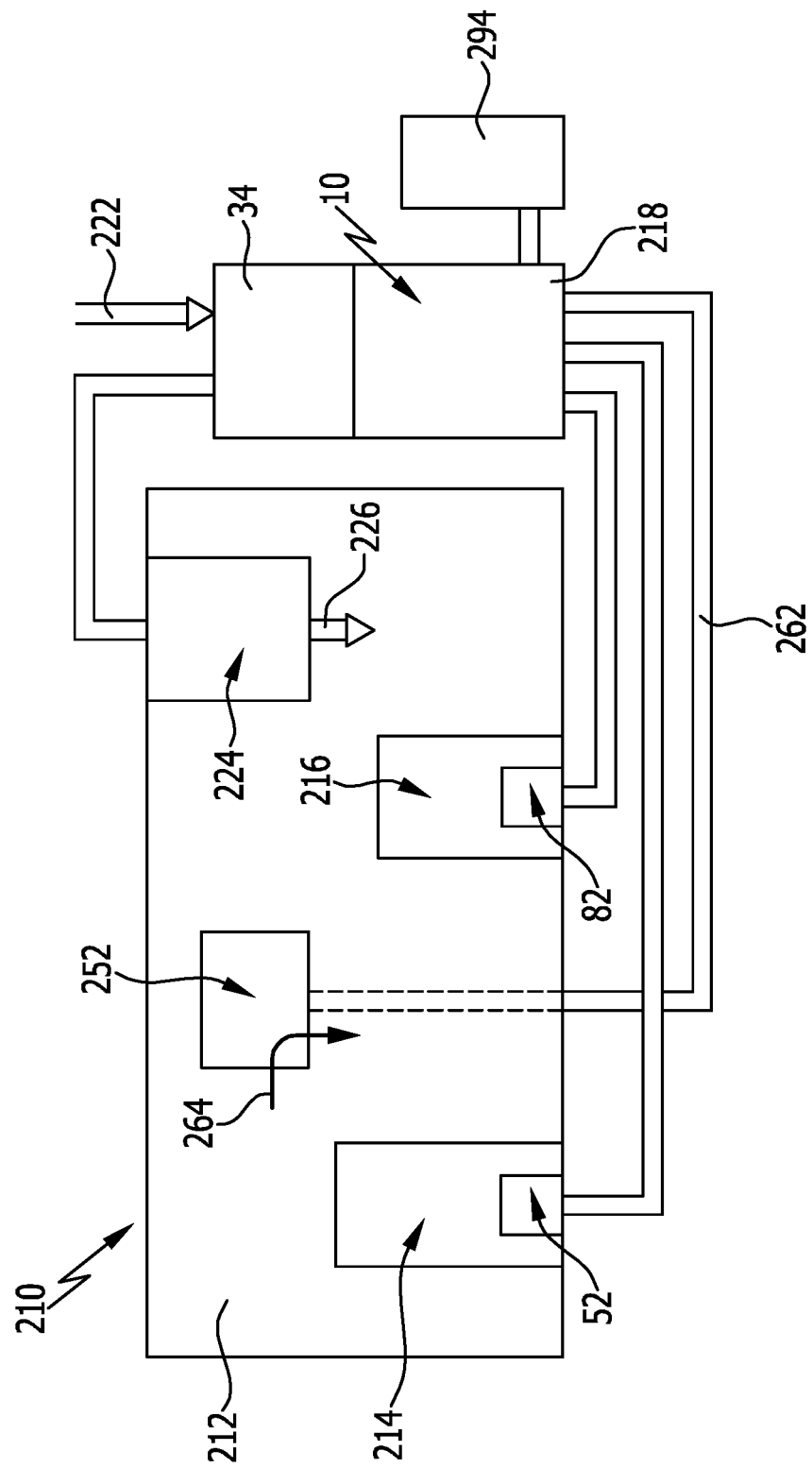

In particular, a refrigeration system 10 in accordance with the previously described exemplary embodiments can be employed—as illustrated in FIG. 13—for optimizing the use of energy in a building 210, in particular, a food market, wherein devices are provided in an interior 212 of the building 210.

In the interior 212 of the building 210 for example, there is provided refrigerating equipment 214 in which goods or objects requiring refrigerating such as foodstuffs for example are kept at a normal refrigerating temperature, i.e. usually a temperature in the range of 0° C. to 5° C., whereby the process of cooling this refrigerating device is effected by the normal refrigerating stage 52 of the refrigeration system in accordance with the invention 10.

Furthermore, a deep-freezing device 216 is provided in the interior 212 in which goods or objects requiring deep-freezing such as frozen food for example, are kept at deep-freezing temperatures, for example, at a temperature in the range of −30° C. to −10° C.

Hereby, the process of cooling the deep-freezing device 216 is effected by the deep-freezing stage 82 of the refrigeration system 10 in accordance with the invention.

Apart from the normal refrigerating stage 52, the deep-freezing stage 82 and the heat exchanger 34, all of the remaining components of the refrigeration system 10 in accordance with the invention are preferably arranged in a space 218 which can either be part of the building 210 or can be arranged near the building 210.

For its part, the heat exchanger 34 that is arranged outside of the space 218 sucks in ambient air 222 for example in order to cool the refrigerant which is at the high pressure PH with this ambient air 222.

In order to enable the building 210 to be operated in an energy-efficient manner, the high pressure side heat exchanger 34 which is arranged outside the building 210 and serves for the heat exchange process with the ambient air 222 is connected in parallel with a heat exchanger 224 which is associated with the building 210 and serves for the purpose of heating interior air 226 which is to be discharged into the interior 212 of the building 210 whereby, for this purpose, the heat exchanger 224 can, depending upon the need, suck in the ambient air 222 of the building 210 and/or the interior air of the building 210 for heating purposes.

Thus, the heat arising on the high pressure side of the refrigeration systems 10 in accordance with the invention can be used in an energy-efficient manner for heating the building, in particular, at times in which the outside temperature of the building 210 is below the sought-for room temperature in the interior 212 thereof.

Moreover, yet another refrigerating heat exchanger 252 is provided in the building 210, in particular, in the interior 212 thereof and it serves for cooling the interior 212 of the building 210 when the outside temperatures are too high or when the sun is shining.

Thereby, the refrigerating heat exchanger 252 is, for example, fed by a parallel circuit 242 which is associated with the intermediate pressure accumulator 42 and which takes in liquid refrigerant from the bath 44 of the liquid refrigerant in the intermediate pressure accumulator 42 through a supply line 244 at a temperature corresponding to the intermediate pressure PZ in the intermediate pressure accumulator 42, evaporates it in an evaporator 246 and then supplies it back to the gas volume 46 of the intermediate pressure accumulator 42 through a discharge line 248.

Hereby, the evaporator 246 is preferably implemented in the form of a flooded evaporator which is cooled by the liquid refrigerant that is entering it due to gravity, whereby this refrigerant then evaporates in this evaporator 246.

Preferably, yet another control element 253 is provided for controlling or regulating the parallel circuit 242 which, in the simplest case, could be a valve or, in a somewhat more complex case, a power controlled pump for liquid refrigerant.

For its part for example, the evaporator 246 cools a transmission circuit 262 through which a heat exchanger medium such as air, brine or water for example is circulating, and, for its part, this can then flow through the refrigerating heat exchanger 252 in the building 210 and be utilised therein for cooling an air flow 264, whereby in the simplest case, this air flow 264 can be an air flow of re-circulated interior air 226 of the building 210.

Typically, temperatures of between 5° C. and 0° C. are present in the intermediate pressure accumulator 42 so that the refrigerating heat exchanger 252 can be operated at these temperatures and consequently the air flow 264 which is flowing through the refrigerating heat exchanger 252 can be cooled in a simple manner.

On the other hand, a refrigerating process of this type entails an increased auxiliary mass flow Z which arises in the intermediate pressure accumulator 42 and therefore has to be either fed via the removal line 132 and the expansion element 134 into the deep-freezing intermediate pressure accumulator 74 and then, after flowing therethrough, has to be compressed again by the refrigerant compressor unit 12 or it has to be exhausted via the auxiliary mass flow removal unit 160. In each case, more heat thereby arises on the high pressure side and this can either be removed by the heat exchanger 34 and exhausted into the surroundings of the building 210 or, under expedient conditions, could be used if necessary by the heat exchanger 224 for heating the building 210, for example, after dehumidifying external air which can be supplied to the interior air 226 in the building 210 as fresh air.

Furthermore, associated with the deep-freezing intermediate pressure accumulator 74, there is also a parallel circuit 272 which comprises a feed line 274 which takes in liquid refrigerant from the bath 76 in the deep-freezing intermediate pressure accumulator 74 and supplies this refrigerant to an evaporator 276 which, for its part, evaporates the liquid refrigerant and supplies it by way of a discharge line 278 back to the gas volume 78 in the deep-freezing intermediate pressure accumulator 74.

In the case of this parallel circuit 272 too, the evaporator 276 is, for example, in the form of a flooded evaporator so that the liquid refrigerant 78 enters it due to gravity, is evaporated in the evaporator 276 and is then supplied in gaseous form over the feed line 274 back to the gas volume in the deep-freezing intermediate pressure accumulator 74.

For the purposes of controlling or regulating the parallel circuit 272, there is likewise provided in the feed line 274 a control element 282 which can be implemented either in the form of an on-off valve or else, if so required, in the form of a power controlled pump.

Furthermore, the evaporator 276 is coupled to a circuit 292 in which there is arranged an external heat exchanger 294 which is arranged outside of the building 210 and also outside the space 218.

With this heat exchanger 294 for example, it is possible to absorb heat in the event of low ambient temperatures and supply this heat to the refrigerant circuit 12 in order to have more heat available to the heat exchanger 224 for the purposes of cooling the refrigerant which is compressed to the high pressure PH and thus, for example, enable the interior 212 of the building 210 to be heated in winter when there are low outside temperatures.

This means that in this case, the refrigeration system 10 in accordance with the invention not only serves to operate the refrigerating equipment 214 and the deep-freezing equipment 216 in the building 210 but also serves for heating the interior 212 of the building by the heat exchanger 224 at the same time.

For example, the refrigerant is present at a temperature of between −12° C. and −5° C. with the usual pressures in the deep-freezing intermediate pressure accumulator 74 so that, in the event of outside temperatures which are higher than the saturated temperature in the deep-freezing intermediate pressure accumulator 74, heat can always be absorbed by the heat exchanger 294 and this can then be emitted by the heat exchanger 224 into the interior 212 of the building 210.

The invention claimed is:

1. Refrigeration system comprising a refrigerant circuit through which an overall mass flow of a refrigerant is fed, a heat exchanger which is arranged in the refrigerant circuit for cooling refrigerant at a high pressure side, an expander which is arranged in the refrigerant circuit and cools the overall mass flow of the refrigerant in an active state by expansion and thereby produces a main mass flow consisting of liquid refrigerant and an auxiliary mass flow consisting of gaseous refrigerant which enter an intermediate pressure accumulator and are separated therein into the main mass flow and the auxiliary mass flow, at least one normal refrigerating stage which extracts a normal refrigerating mass flow from the main mass flow in the intermediate pressure accumulator and expands the normal refrigerating mass flow to a low pressure in at least one normal refrigerating expander and heat exchanger and thereby makes a refrigerating capacity available for a normal refrigerating process, a refrigerant compressor unit which compresses the normal refrigerating mass flow from low pressure to high pressure, and a parallel compressor which sucks gaseous refrigerant from the intermediate pressure accumulator in a parallel compression mode of operation of the refrigerant circuit and compresses the normal refrigerating mass flow to high pressure, a power of the parallel compressor is controlled by a controller, in that the controller determines at least one reference variable representing a load state of the refrigerant circuit, the controller determines at least one set intermediate pressure value on a basis of the at least one reference variable in the parallel compression mode of operation, and the controller regulates an intermediate pressure in accordance with the set intermediate pressure value at least in the parallel compressor mode of operation; and
wherein a relationship between the reference variable and the set intermediate pressure value changing therewith is determined in such a way that, taken with reference to the efficiency in a case of constant intermediate pressure in the parallel compression mode of operation, there is an increase of an efficiency due to a varying set intermediate pressure value.

2. A refrigeration system in accordance with claim 1, wherein the controller only takes into consideration reference variables lying within an intermediate-pressure-varying range of reference variables for a determination of the set intermediate pressure value.

3. A refrigeration system in accordance with claim 2, wherein the intermediate-pressure-varying range of reference variables is a sub-range of a load-dependent range of reference variables.

4. A refrigeration system in accordance with claim 1, wherein the controller only draws on set intermediate pressure values for a regulation of the intermediate pressure which lie in a range extending from a minimum intermediate pressure up to a maximum intermediate pressure.

5. A refrigeration system in accordance with claim 1, wherein an increase of a value of the reference variable within an intermediate-pressure-varying range of reference variables leads to an increase of a value of the set intermediate pressure value.

6. A refrigeration system in accordance with claim 1, wherein there is a linear relationship between a value of the reference variable and the set intermediate pressure value within a range of reference variables.

7. A refrigeration system in accordance with claim 1, wherein a relationship between a value of the reference variable and the set intermediate pressure value is nonlinear within the intermediate-pressure-varying range of reference variables.

8. A refrigeration system in accordance with claim 1, wherein the values for the set intermediate pressure value are possible values lying along operating limits of the parallel compressor.

9. A refrigeration system in accordance with claim 1, wherein value of the high pressure in the refrigerant circuit represents the reference variable.

10. A refrigeration system in accordance with claim 1, wherein a temperature of the refrigerant when emerging from the high pressure side of the heat exchanger represents the reference variable.

11. A refrigeration system in accordance with claim 1, wherein a value of an ambient temperature of air cooling the heat exchanger on the high pressure side represents the reference variable.

12. A refrigeration system in accordance with claim 1, wherein an intermediate-pressure-varying range of reference variables comprises therein a thermodynamically critical reference variable value.

13. A refrigeration system in accordance with claim 1, wherein an intermediate-pressure-varying range of reference variables lies close to a thermodynamically critical reference variable value.

14. A refrigeration system in accordance with claim 1, wherein an intermediate-pressure-varying range of reference variables extends from an upper reference variable value to a lower reference variable value.

15. A refrigeration system in accordance with claim 14, wherein the upper reference variable value coincides with the reference variable at full load.

16. A refrigeration system in accordance with claim 14, wherein the upper reference variable value lies below the reference variable at full load.

17. A refrigeration system in accordance with claim 14, wherein the lower reference variable value coincides with a parallel-compression-limiting reference variable value.

18. A refrigeration system in accordance with claim 14, wherein the lower reference variable value lies above a parallel-compression-limiting reference variable value.

19. A refrigeration system in accordance with claim 1, wherein the controller switches over from a parallel compression mode of operation to a flashgas/bypass mode of operation if the reference variable falls below a parallel-compression-limiting reference variable value.

20. A refrigeration system in accordance with claim 19, wherein the controller switches off the parallel compressor in the flashgas/bypass mode of operation.

21. A refrigeration system in accordance with claim 19, wherein in the flashgas/bypass mode of operation, the controller sets the parallel compressor from low pressure to high pressure for purposes of compressing the refrigerant.

22. A refrigeration system in accordance with claim 1, wherein in a flashgas/bypass mode of operation, the controller expands the refrigerant from the intermediate pressure accumulator to a lower pressure level by means of the expander and holds the intermediate pressure at a predeterminable value.

23. A refrigeration system in accordance with claim 22, wherein in the flashgas/bypass mode of operation, the expander expands the refrigerant from the intermediate pressure accumulator to low pressure.

24. Refrigeration system comprising a refrigerant circuit through which an overall mass flow of a refrigerant is fed, a heat exchanger which is arranged in the refrigerant circuit for cooling refrigerant at a high pressure side, an expander which is arranged in the refrigerant circuit and cools the overall mass flow of the refrigerant in an active state by expansion and thereby produces a main mass flow consisting of liquid refrigerant and an auxiliary mass flow consisting of gaseous refrigerant which enter an intermediate pressure accumulator and are separated therein into the main mass flow and the auxiliary mass flow, at least one normal refrigerating stage which extracts a normal refrigerating mass flow from the main mass flow in the intermediate pressure accumulator and expands the normal refrigerating mass flow to a low pressure in at least one normal refrigerating expander and heat exchanger and thereby makes a refrigerating capacity available for a normal refrigerating process, a refrigerant compressor unit which compresses the normal refrigerating mass flow from low pressure to high pressure, and a parallel compressor which sucks gaseous refrigerant from the intermediate pressure accumulator in a parallel compression made of operation of the refrigerant circuit and compresses the normal refrigerating mass flow to high pressure, a powder of the parallel compressor is controller by a controller, in that the controller determines at least one reference variable representing a load state of the refrigerant circuit, the controller determines at least one set intermediate pressure value on a basis of the at least one reference variable in the parallel compression mode of operation, and the controller regulates an intermediate pressure in accordance with the set intermediate pressure value at least in the parallel compressor mode of operation, wherein a relationship between a value of the reference variable and the set intermediate pressure value is predetermined by operating limits of the parallel compressor.

25. Refrigeration system comprising a refrigerant circuit through which an overall mass flow of a refrigerant is fed, a heat exchanger which is arranged in the refrigerant circuit for cooling refrigerant at a high pressure side, an expander which is arranged in the refrigerant circuit and cools the overall mass flow of the refrigerant in an active state by expansion and thereby produces a main mass flow consisting of liquid refrigerant and an auxiliary mass flow consisting of gaseous refrigerant which enter an intermediate pressure accumulator and are separated therein into the main mass flow and the auxiliary mass flow, at least one normal refrigerating stage which extracts a normal refrigerating mass flow from the main mass flow in the intermediate pressure accumulator and expands the normal refrigerating mass flow to a low pressure in at least one normal refrigerating expander and heat exchanger and thereby makes a refrigerating capacity available for a normal refrigerating process, a refrigerant compressor unit which compresses the normal refrigerating mass flow from low pressure to high pressure, and a parallel compressor which sucks gaseous refrigerant from the intermediate pressure accumulator in a parallel compression mode of operation of the refrigerant circuit and compresses the normal refrigerating mass flow to high pressure, a power of the parallel compressor is controller by a controller, in that the controller determines at least one reference variable representing a load state of the refrigerant circuit, the controller determines at least one set intermediate pressure value on a basis of the at least one reference variable in the parallel compression mode of operation, and the controller regulates an intermediate pressure in accordance with the set intermediate pressure value at least in the parallel compressor mode of operation, wherein a relationship between the reference variable and the set intermediate pressure value is predetermined in that a greatest possible value of the set intermediate pressure value within operating limits of the parallel compressor is selected for respective values of the reference variable.

26. Refrigeration system comprising a refrigerant circuit through which an overall mass flow of a refrigerant is fed, a heat exchanger which is arranged in the refrigerant circuit for cooling refrigerant at a high pressure side, an expander which is arranged in the refrigerant circuit and cools the overall mass flow of the refrigerant in an active state by expansion and thereby produces a main mass flow consisting of liquid refrigerant and an auxiliary mass flow consisting of gaseous refrigerant which enter an intermediate pressure accumulator and are separated therein into the main mass flow and the auxiliary mass flow, at least one normal refrigerating stage which extracts a normal refrigerating mass flow from the main mass flow in the intermediate pressure accumulator and expands the normal refrigerating mass flow to a low pressure in at least one normal refrigerating expander and heat exchanger and thereby makes a refrigerating capacity available for a normal refrigerating process, a refrigerant compressor unit which compresses the normal refrigerating mass flow from low pressure to high pressure, and a parallel compressor which sucks gaseous refrigerant from the intermediate pressure accumulator in a parallel compression made of operation of the refrigerant circuit and compresses the normal refrigerating mass flow to high pressure, a powder of the parallel compressor is controller by a controller, in that the controller determines at least one reference variable representing a load state of the refrigerant circuit, the controller determines at least one set intermediate pressure value on a basis of the at least one reference variable in the parallel compression mode of operation, and the controller regulates an intermediate pressure in accordance with the set intermediate pressure value at least in the parallel compressor mode of operation, wherein the controller interrupts a variation of the set intermediate pressure value in dependence on the reference variable if a rotational speed of the parallel compressor has fallen to a predetermined minimum rotational speed and the controller restarts the variation when the rotational speed of the parallel compressor is again higher than a predetermined minimum rotational speed.

27. Refrigeration system comprising a refrigerant circuit through which an overall mass flow of a refrigerant is fed, a heat exchanger which is arranged in the refrigerant circuit for cooling refrigerant at a high pressure side, an expander which is arranged in the refrigerant circuit and cools the overall mass flow of the refrigerant in an active state by expansion and thereby produces a main mass flow consisting of liquid refrigerant and an auxiliary mass flow consisting of gaseous refrigerant which enter an intermediate pressure accumulator and are separated therein into the main mass flow and the auxiliary mass flow, at least one normal refrigerating stage which extracts a normal refrigerating mass flow from the main mass flow in the intermediate pressure accumulator and expands the normal refrigerating mass flow to a low pressure in at least one normal refrigerating expander and heat exchanger and thereby makes a refrigerating capacity available for a normal refrigerating process, a refrigerant compressor unit which compresses the normal refrigerating mass flow from low pressure to high pressure, and a parallel compressor which sucks gaseous refrigerant from the intermediate pressure accumulator in a parallel compression made of operation of the refrigerant circuit and compresses the normal refrigerating mass flow to high pressure, a powder of the parallel compressor is controller by a controller, in that the controller determines at least one reference variable representing a load state of the refrigerant circuit, the controller determines at least one set intermediate pressure value on a basis of the at least one reference variable in the parallel compression mode of operation, and the controller regulates an intermediate pressure in accordance with the set intermediate pressure value at least in the parallel compressor mode of operation, wherein the controller interrupts a variation of the set intermediate pressure value in dependence on the reference variable if an opening degree of the expander has fallen to a predetermined minimum opening degree, and the controller restarts the variation when the opening degree of the expander is again larger than the predetermined minimum opening degree.

28. Method of operating a refrigeration system comprising a refrigerant circuit through which an overall mass flow of a refrigerant is fed, a heat exchanger which is arranged in the refrigerant circuit for cooling refrigerant at a high pressure side, an expander which is arranged in the refrigerant circuit and cools the overall mass flow of the refrigerant in an active state by expansion and thereby produces a main mass flow consisting of liquid refrigerant and an auxiliary mass flow consisting of gaseous refrigerant which enter an intermediate pressure accumulator and are separated therein into the main mass flow and the auxiliary mass flow, at least one normal refrigerating stage which extracts a normal refrigerating mass flow from the main mass flow in the intermediate pressure accumulator and expands the normal refrigerating mass flow to a low pressure in at least one normal refrigerating expander and heat exchanger and thereby makes a refrigerating capacity available for a normal refrigerating process, a refrigerant compressor unit which compresses the normal refrigerating mass flow from low pressure to high pressure, and a parallel compressor which sucks gaseous refrigerant from the intermediate pressure accumulator in a parallel compression mode of operation of the refrigerant circuit and compresses the normal refrigerating mass flow to high pressure, wherein the parallel compressor is controlled in power, at least one reference variable representing a load state of the refrigerant circuit is determined, a set intermediate pressure value is determined on a basis of the at least one reference variable at least in the parallel compression mode of operation, and an intermediate pressure is regulated in accord with the set intermediate pressure value at least in the parallel compressor mode of operation, and
  wherein a relationship between the reference variable and the set intermediate pressure value changing therewith is determined in such a way that, taken with reference to the efficiency in a case of constant intermediate pressure in the parallel compression mode of operation, there is an increase of an efficiency due to a varying set intermediate pressure value.

29. A method in accordance with claim 28, wherein for purposes of determining the set intermediate pressure value, only reference variables lying within an intermediate-pressure-varying range of reference variables are taken into consideration.

30. A method in accordance with claim 29, wherein the intermediate-pressure-varying range of reference variables is a sub-range of a load-dependent range of reference variables.

31. A method in accordance with claim 28, wherein a controller only draws on set intermediate pressure values for a regulation of the intermediate pressure which lie in a range extending from a minimum intermediate pressure up to a maximum intermediate pressure.

32. A method in accordance with claim 28, wherein an increase of a value of the reference variable within an intermediate-pressure-varying range of reference variables leads to an increase of the value of the set intermediate pressure value.

33. A method in accordance with claim 28, wherein there is a linear relationship between a value of the reference variable and the set intermediate pressure value within a range of reference variables.

34. A method in accordance with claim 28, wherein a relationship between a value of the reference variable and the set intermediate pressure value is nonlinear within an intermediate-pressure-varying range of reference variables.

35. A method in accordance with claim 28, wherein a value of the high pressure in the refrigerant circuit represents the reference variable.

36. A method in accordance with claim 28, wherein possible values of the set intermediate pressure value lying along operating limits of the parallel compressor are selected as values for the set intermediate pressure value.

37. A method in accordance with claim 28, wherein a temperature of the refrigerant when emerging from the high pressure side of the heat exchanger represents the reference variable.

38. A method in accordance with claim 28, wherein the value of an ambient temperature of air cooling the heat exchanger on the high pressure side represents the reference variable.

39. A method in accordance with claim 28, wherein an intermediate-pressure-varying range of reference variables comprises therein a thermodynamically critical reference variable value.

40. A method in accordance with claim 28, wherein an intermediate-pressure-varying range of reference variables lies close to a thermodynamically critical reference variable value.

41. A method in accordance with claim 28, wherein an intermediate-pressure-varying range of reference variables extends from an upper reference variable value to a lower reference variable value.

42. A method in accordance with claim 41, wherein the upper reference variable value coincides with the reference variable at full load.

43. A method in accordance with claim 41, wherein the upper reference variable value lies below the reference variable at full load.

44. A method in accordance with claim 41, wherein the lower reference variable value coincides with a parallel-compression-limiting reference variable value.

45. A method in accordance with claim 41, wherein the lower reference variable value lies above the parallel-compression-limiting reference variable value.

46. A method in accordance with claim 28, wherein if the reference variable falls below a parallel-compression-limiting reference variable value, then there is a switch from the parallel compression mode of operation to a flashgas/bypass mode of operation.

47. A method in accordance with claim 46, wherein the parallel compressor switches off in the flashgas/bypass mode of operation.

48. A method in accordance with claim 46, wherein in the flashgas/bypass mode of operation of the parallel compressor, a controller is set for the compression of refrigerant from low pressure to high pressure.

49. A method in accordance with claim 28, wherein in a flashgas/bypass mode of operation, the expander expands the refrigerant from the intermediate pressure accumulator to a lower pressure level and holds the intermediate pressure at a presettable value.

50. A method in accordance with claim 49, wherein in the flashgas/bypass mode of operation, the expander expands the refrigerant to a low pressure.

51. Method of operating a refrigeration system comprising a refrigerant circuit through which an overall mass flow of a refrigerant is fed, a heat exchanger which is arranged in the refrigerant circuit for cooling refrigerant at a high pressure side, an expander which is arranged in the refrigerant circuit and cools the overall mass flow of the refrigerant in an active state by expansion and thereby produces a main mass flow consisting of liquid refrigerant and an auxiliary mass flow consisting of gaseous refrigerant which enter an intermediate pressure accumulator and are separated therein into the main mass flow and the auxiliary mass flow, at least one normal refrigerating stage which extracts a normal refrigerating mass flow from the main mass flow in the intermediate pressure accumulator and expands the normal refrigerating mass flow to a low pressure in at least one normal refrigerating expander and heat exchanger and thereby makes a refrigerating capacity available for a normal refrigerating process, a refrigerant compressor unit which compresses the normal refrigerating mass flow from low pressure to high pressure, and a parallel compressor which sucks gaseous refrigerant from the intermediate pressure accumulator in a parallel compression mode of operation of the refrigerant circuit and compresses the normal refrigerating mass flow to high pressure, wherein the parallel compressor is controlled in power, at least one reference variable representing a load state of the refrigerant circuit is determined, a set intermediate pressure value is determined on a basis of the at least one reference variable at least in the parallel compression mode of operation, and an intermediate pressure is regulated in accord with the set intermediate pressure value at least in the parallel compressor mode of operation, wherein a relationship between a value of the reference variable and the set intermediate pressure value is predetermined by operating limits of the parallel compressor.

52. Method of operating a refrigeration system comprising a refrigerant circuit through which an overall mass flow of a refrigerant is fed, a heat exchanger which is arranged in the refrigerant circuit for cooling refrigerant at a high pressure side, an expander which is arranged in the refrigerant circuit and cools the overall mass flow of the refrigerant in an active state by expansion and thereby produces a main mass flow consisting of liquid refrigerant and an auxiliary mass flow consisting of gaseous refrigerant which enter an intermediate pressure accumulator and are separated therein into the main mass flow and the auxiliary mass flow, at least one normal refrigerating stage which extracts a normal refrigerating mass flow from the main mass flow in the intermediate pressure accumulator and expands the normal refrigerating mass flow to a low pressure in at least one normal refrigerating expander and heat exchanger and thereby makes a refrigerating capacity available for a normal refrigerating process, a refrigerant compressor unit which compresses the normal refrigerating mass flow from low pressure to high pressure, and a parallel compressor which sucks gaseous refrigerant from the intermediate pressure accumulator in a parallel compression mode of operation of the refrigerant circuit and compresses the normal refrigerating mass flow to high pressure, wherein the parallel compressor is controlled in power, at least one reference variable representing a load state of the refrigerant circuit is determined, a set intermediate pressure value is determined on a basis of the at least one reference variable at least in the parallel compression mode of operation, and an intermediate pressure is regulated in accord with the set intermediate pressure value at least in the parallel compressor mode of operation, wherein a relationship between the reference variable and the set intermediate pressure value is predetermined in that a greatest possible value of the set intermediate pressure value within operating limits of the parallel compressor is selected for respective values of the reference variable.

53. Method of operating a refrigeration system comprising a refrigerant circuit through which an overall mass flow of a refrigerant is fed, a heat exchanger which is arranged in the refrigerant circuit for cooling refrigerant at a high pressure side, an expander which is arranged in the refrigerant circuit and cools the overall mass flow of the refrigerant in an active state by expansion and thereby produces a main mass flow consisting of liquid refrigerant and an auxiliary mass flow consisting of gaseous refrigerant which enter an intermediate pressure accumulator and are separated therein into the main mass flow and the auxiliary mass flow, at least one normal refrigerating stage which extracts a normal refrigerating mass flow from the main mass flow in the intermediate pressure accumulator and expands the normal refrigerating mass flow to a low pressure in at least one normal refrigerating expander and heat exchanger and thereby makes a refrigerating capacity available for a normal refrigerating process, a refrigerant compressor unit which compresses the normal refrigerating mass flow from low pressure to high pressure, and a parallel compressor which sucks gaseous refrigerant from the intermediate pressure accumulator in a parallel compression mode of operation of the refrigerant circuit and compresses the normal refrigerating mass flow to high pressure, wherein the parallel compressor is controlled in power, at least one reference variable representing a load state of the refrigerant circuit is determined, a set intermediate pressure value is determined on a basis of the at least one reference variable at least in the parallel compression mode of operation, and an intermediate pressure is regulated in accord with the set intermediate pressure value at least in the parallel compressor mode of operation, wherein a variation of the set intermediate pressure value in dependence on the reference variable is interrupted if a rotational speed of the parallel compressor has fallen to a predetermined minimum rotational speed and is re-commenced when the rotational speed of the parallel compressor is again higher than the predetermined minimum rotational speed.

54. Method of operating a refrigeration system comprising a refrigerant circuit through which an overall mass flow of a refrigerant is fed, a heat exchanger which is arranged in the refrigerant circuit for cooling refrigerant at a high pressure side, an expander which is arranged in the refrigerant circuit and cools the overall mass flow of the refrigerant in an active state by expansion and thereby produces a main mass flow consisting of liquid refrigerant and an auxiliary mass flow consisting of gaseous refrigerant which enter an intermediate pressure accumulator and are separated therein into the main mass flow and the auxiliary mass flow, at least one normal refrigerating stage which extracts a normal refrigerating mass flow from the main mass flow in the intermediate pressure accumulator and expands the normal refrigerating mass flow to a low pressure in at least one normal refrigerating expander and heat exchanger and thereby makes a refrigerating capacity available for a normal refrigerating process, a refrigerant compressor unit which compresses the normal refrigerating mass flow from low pressure to high pressure, and a parallel compressor which sucks gaseous refrigerant from the intermediate pressure accumulator in a parallel compression mode of operation of the refrigerant circuit and compresses the normal refrigerating mass flow to high pressure, wherein the parallel compressor is controlled in power, at least one reference variable representing a load state of the refrigerant circuit is determined, a set intermediate pressure value is determined on a basis of the at least one reference variable at least in the parallel compression mode of operation, and an intermediate pressure is regulated in accord with the set intermediate pressure value at least in the parallel compressor mode of operation, wherein a variation of the set intermediate pressure value in dependence on the reference variable is interrupted if an opening degree of the expander has fallen to a predetermined minimum opening degree and is re-commenced when the opening degree of the expander is again larger than the predetermined minimum opening degree.

* * * * *

UNITED STATES PATENT AND TRADEMARK OFFICE
CERTIFICATE OF CORRECTION

PATENT NO. : 10,605,509 B2
APPLICATION NO. : 15/878882
DATED : March 31, 2020
INVENTOR(S) : Oliver Javerschek It is certified that error appears in the above-identified patent and that said Letters Patent is hereby corrected as shown below:

In the Claims

Claim 9, at Column 24, Line 11, incorrectly reads "wherein value of the high pressure in the refrigerant circuit", and should read -- wherein a value of the high pressure in the refrigerant circuit --

Signed and Sealed this
Twenty-sixth Day of May, 2020

Andrei Iancu
*Director of the United States Patent and Trademark Office*